(12) United States Patent
Tornielli

(10) Patent No.: US 10,440,081 B2
(45) Date of Patent: Oct. 8, 2019

(54) CONTENT DELIVERY SYSTEM

(71) Applicant: PIKSEL, INC., Wilmington, DE (US)

(72) Inventor: Giorgio Tornielli, Mortara (IT)

(73) Assignee: PIKSEL, INC, Wilmington, DE (US)

( * ) Notice: Subject to any disclaimer, the term of this patent is extended or adjusted under 35 U.S.C. 154(b) by 34 days.

(21) Appl. No.: 15/307,762

(22) PCT Filed: Apr. 30, 2015

(86) PCT No.: PCT/EP2015/059598
§ 371 (c)(1),
(2) Date: Oct. 28, 2016

(87) PCT Pub. No.: WO2015/166086
PCT Pub. Date: Nov. 5, 2015

(65) Prior Publication Data
US 2017/0054778 A1     Feb. 23, 2017

(30) Foreign Application Priority Data

Apr. 30, 2014  (GB) .................................. 1407614.5

(51) Int. Cl.
*G06Q 30/06*  (2012.01)
*H04L 29/06*  (2006.01)
(Continued)

(52) U.S. Cl.
CPC .......... *H04L 65/601* (2013.01); *G06Q 10/10* (2013.01); *G06Q 10/101* (2013.01);
(Continued)

(58) Field of Classification Search
CPC ............. G06F 17/30017; H04L 45/021; H04L 61/1541; H04L 67/16
See application file for complete search history.

(56) References Cited

U.S. PATENT DOCUMENTS

2009/0099919 A1   4/2009  Schultheiss
2009/0327244 A1   12/2009 Rizal
(Continued)

OTHER PUBLICATIONS

International Search Report and Written Opinion; dated Aug. 5, 2015; European Patent Office.
(Continued)

*Primary Examiner* — Barbara B Anyan
(74) *Attorney, Agent, or Firm* — Holzer Patel Drennan

(57) ABSTRACT

Disclosed is a content delivery system of networked computer systems, the content delivery system for effecting transmission of media assets to a user device having an output interface available to a user, the media asset being transmitted as a media stream for outputting to the user while the media stream is still being received at the user device. The content delivery system comprises a first computer system operated by a first operator and a second computer system operated by a second operator. Each of the first and second computer systems is configured to execute a respective instance of contract software for effecting the transmission of the media asset to the user device as the media stream. The contract software embodies a contract between the first operator and the second operator defining permitted interactions of their computer systems.

18 Claims, 11 Drawing Sheets

(51) Int. Cl.
*G06Q 10/10* (2012.01)
*G06Q 30/02* (2012.01)
*H04L 29/08* (2006.01)
*G06Q 30/04* (2012.01)
*H04L 12/755* (2013.01)
*G06Q 20/10* (2012.01)

(52) U.S. Cl.
CPC .......... *G06Q 10/103* (2013.01); *G06Q 30/02* (2013.01); *G06Q 30/0241* (2013.01); *G06Q 30/06* (2013.01); *G06Q 30/0601* (2013.01); *H04L 67/02* (2013.01); *H04L 67/28* (2013.01); *H04L 67/42* (2013.01); *G06Q 20/10* (2013.01); *G06Q 30/04* (2013.01); *H04L 45/021* (2013.01); *H04L 63/107* (2013.01)

(56) References Cited

U.S. PATENT DOCUMENTS

| | | | | |
|---|---|---|---|---|
| 2010/0318529 | A1* | 12/2010 | Dor | G06F 17/30017 707/758 |
| 2011/0105077 | A1* | 5/2011 | Chandrasekaran | H04L 63/107 455/406 |
| 2011/0145103 | A1* | 6/2011 | Ljunggren | G06Q 30/04 705/27.1 |
| 2011/0145111 | A1* | 6/2011 | Ljunggren | G06Q 20/10 705/30 |
| 2011/0225617 | A1* | 9/2011 | Rakib | H04N 21/462 725/109 |
| 2013/0094445 | A1* | 4/2013 | De Foy | H04L 45/021 370/328 |
| 2014/0115119 | A1 | 4/2014 | Padinjareveetil | |

OTHER PUBLICATIONS

Mohsen Rouached et al., "A Contract Layered Architecture for Regulating Cross-Organisational Business Processes", Jan. 1, 2005, Business Process Management Lecture Notes in Computer Science; LNCS, Springer, Berlin.

Anonymous, "Peer-toPeer—Wikipedia, the free encyclopedia". Apr. 29, 2014, XP055204670 from Internet, URL:https://en.wikipedia.org/w/index.php?title Peer-topeer&oldid=606144519 [retrieved on Jul. 24, 2015].

* cited by examiner

CONTENT DELIVERY SYSTEM

TECHNICAL FIELD

The disclosure pertains to the field of media streaming.

BACKGROUND

An ever-increasing quantity of media content is being produced that can be viewed by a content consuming user (content consumer) on a viewing device, such as a television ("TV") or similar. Moreover, a wide range of mechanisms are now available for delivering such content in addition to traditional delivery mechanisms such as delivery via a broadcast channel to a television. These include on-demand delivery to user devices such as smart-TVs, set-top boxes, smartphone or tablet devices, desktop computers, laptop computers etc. whereby a content consumer can stream media content (for online consumption) or download media content (for offline consumption) from a server over a network, such as the Internet or a cable TV network, at a time of their choosing. On-demand services are typically accessed by a user using a user device on which is executed suitable media client software such as a web-browser, media streaming or download application (or "app") e.g. provided by the broadcaster or service provider, or embedded software e.g. embedded in a set-top box provided by an operator of a cable TV network.

As used herein, a "media stream" refers to media data that is encoded and transmitted to a user device in a manner that enables the user device to begin outputting the media data to a user of the user device before the media data has been received in its entirety (that is, while the media stream is still being received at the user device). Typically, a user can begin streaming a media asset from any desired temporal point in that media asset (which may or may not be the start of that media asset) and the stream is received in real-time (that is at a data rate of at least one second of media per second of transmission time) so that later parts of the media asset are received at least as fast as earlier parts are consumed by the user.

An individual piece of media content—equivalently referred to herein as a "media asset"—e.g. a video asset such as a film or episode of a television series may comprise both audio data and video data to be transmitted as audio and video streams. The audio and video are typically encoded separately. For example, the audio stream may be encoded into a compressed audio format (e.g. MP3) and the video stream may be encoded into a compressed video format (e.g. H.264). The encoded audio and video are typically assembled in a container bitstream (e.g. MPEG-4 format), which is transmitted from a streaming server to a streaming client (e.g. client software) of the user device for outputting as it is received (e.g. using a streaming transport protocol such as the Real-Time Transport Protocol (RTP)).

SUMMARY

According to a first aspect, the present invention is directed to a content delivery system of networked computer systems, the content delivery system comprising: a user device having an output interface available to a user; a content aggregation computer system, operated by a content aggregator, holding a catalogue of media assets in computer storage, the catalogue accessible from the user device; and a content supply computer system, operated by a content supplier, for effecting streaming of the media assets to devices in the content delivery system; wherein each of the content aggregation and content supply systems is configured to execute a respective instance of contract software, the contract software embodying a contract between the content supplier and the content aggregator defining permitted interactions of their computer systems; and wherein responsive to a content access request identifying the user and a requested media asset, the content aggregation instance is configured to detect whether the contract permits the identified user to access the identified asset and if so to grant the user device access to the content supply instance, thereby enabling the identified asset to be transmitted to the user device as a media stream for outputting to the user while the media stream is still being received at the user device.

Existing media streaming systems tend to be expensive proprietary systems having a complex and highly centralized architecture. In contrast, the content delivery system of the present invention distributes system functionality across multiple computer systems, which are operated and maintained independently of one another by different operators. Because interactions between these separate systems are mediated by contract software, contractual agreements between the different operators of the systems are automatically enforced within the system. Thus, the content delivery system is able to operate automatically within the confines of these inter-operator agreements without requiring any form of centralized control within the system. That is, the contract software makes it viable for the different distributed computer systems to operate in a peer-to-peer fashion whilst still ensuring that agreements between the different operators are automatically upheld without requiring any significant manual oversight.

By eliminating, the need for a centralized entity (which would otherwise be required to mediate and oversee signalling between the different distributed computer systems), the content delivery system architecture is greatly simplified, and the cost thereof greatly reduced, whilst still maintaining integrity and moreover signalling within the content delivery system is made more efficient due to the direct, peer-to-peer nature thereof.

In embodiments including those described below, contract software is provided in the form of executable contract software elements, each embodying a contract (i.e. contractual agreement) between two parties, instances of which are executed within a contract execution software environment of a computer system. It should be noted that, to aid readability, the term "contract" is sometimes used hereinbelow as shorthand to refer to an executable contract software element embodying that contract. It will be clear from the context in which the term is used whether it refers to the contract software element or to the underlying agreement itself.

Further, it should be noted that the terms "entity" and "party" are used variously to refer both to an operator of a computer system and to the computer system itself. Again, it will be apparent from the context which is meant. It should be noted that, in particular, where the description refers to actions being carried out by an entity or party in accordance with a contract (or similar), this refers to an automated process whereby those actions are effected automatically by the relevant computer system executing an instance of the relevant contract software.

In embodiments, the content aggregation instance may operate as a first software agent which runs substantially continuously over an interval of time to monitor for the content access request; the content supply instance may operate as a second software agent which runs substantially continuously over the interval of time to monitor for a further request, the further request identifying the user and the requested media asset and requesting access to the content supply instance as granted by the content aggregation instance.

One of the computer systems may be operable to publish an offer of the contract at a network location accessible to the other of the computer systems; responsive to an accept request instigated by the other computer system to accept the published in offer, the contract software may be instantiated to create the content aggregation instance and the content supply instance.

The content aggregation instance may grant access to the content supply instance by returning a proxy object to the user device.

Each of the content aggregation and content supply computer systems may be configured to execute a respective contract execution environment, and the respective contract software instance may run inside that contract execution environment.

The content supplier may be a content provider and the content supply computer system may be a content providing computer system; responsive to a license request, the license request identifying the user and the requested media asset and requesting access to the content providing instance as granted by the content aggregation instance, the content providing instance may be configured to issue a digital license to the user for unlocking the identified asset.

The content supplier may be a content delivery network provider and the content supply computer system may be a content delivery network for streaming the media assets; responsive to a streaming request, the streaming request identifying the user and the requested media asset and requesting access to the content delivery network instance as granted by the content aggregation instance, the content delivery network instance may be configured to instigate the media stream to the user device.

The media assets may be video assets and the media stream may be a video stream.

Each of the content aggregation system and content supply system and the user device may be configured to execute a respective instance of further contract software, the further contract software embodying a contract between the user and the content aggregator defining permitted interactions of the content aggregation system and the user device; the content access request may be instigated by the further contract software instance on the user device.

The content access request may be instigated responsive to a user input at the user device.

According to a second aspect, the invention is directed to a computer program product comprising executable contract software stored on a computer-readable storage medium and embodying a contract between a content supplier and a content aggregator defining permitted interactions of their computer systems, the contract software configured when instantiated on each of those computer systems to implement the content delivery system of any preceding claim.

According to a third aspect, the invention is directed to a method of streaming media content to a user device having an output interface available to a user in a content delivery system of networked computer systems, the content delivery system comprising a content aggregation computer system, operated by a content aggregator, holding a catalogue of media assets in computer storage, the catalogue accessible from the user device, and a content supply computer system, operated by a content supplier, for effecting streaming of the media assets to devices in the content delivery system, wherein each of the content aggregation and content supply systems is configured to execute a respective instance of contract software, the contract software embodying a contract between the content supplier and the content aggregator defining permitted interactions of their computer systems, the method comprising: the content aggregation instance receiving a content access request identifying the user and a requested media asset; and responsive to receiving the content access request, the content aggregation instance detecting whether the contract permits the identified user to access the identified asset and if so granting the user device access to the content supply instance, thereby enabling the identified asset to be transmitted to the user device as a media stream for outputting to the user while the media stream is still being received at the user device.

According to a fourth aspect, the invention is directed to a content delivery system of networked computer systems, the content delivery system for effecting transmission of media assets to a user device having an output interface available to a user, the media asset being transmitted as a media stream for outputting to the user while the media stream is still being received at the user device, the content delivery system comprising: a first computer system operated by a first operator; and second computer system operated by a second operator; wherein each of the first and second computer systems is configured to execute a respective instance of contract software for effecting the transmission of the media asset to the user device as the media stream, the contract software embodying a contract between the first operator and the second operator defining permitted interactions of their computer systems; and wherein each contract software instance is configured, in effecting the transmission of the media asset to the user device as the media stream, to interact with the other contract instance by automatically performing expected actions specified in the contract responsive to requests specified in the contract and automatically instigated by the other contract software instance.

According to another aspect, the present invention is directed to a computer program product comprising executable code stored on a computer-readable storage medium (such as electronic or magnetic memory) configured when executed to implement any of the methods and/or systems disclosed herein. The executable code may comprise contract software embodying a contract between entities defining permitted interactions of those entities' computer systems.

DETAILED DESCRIPTION

Exemplary embodiments will now be described.

Figure 1:
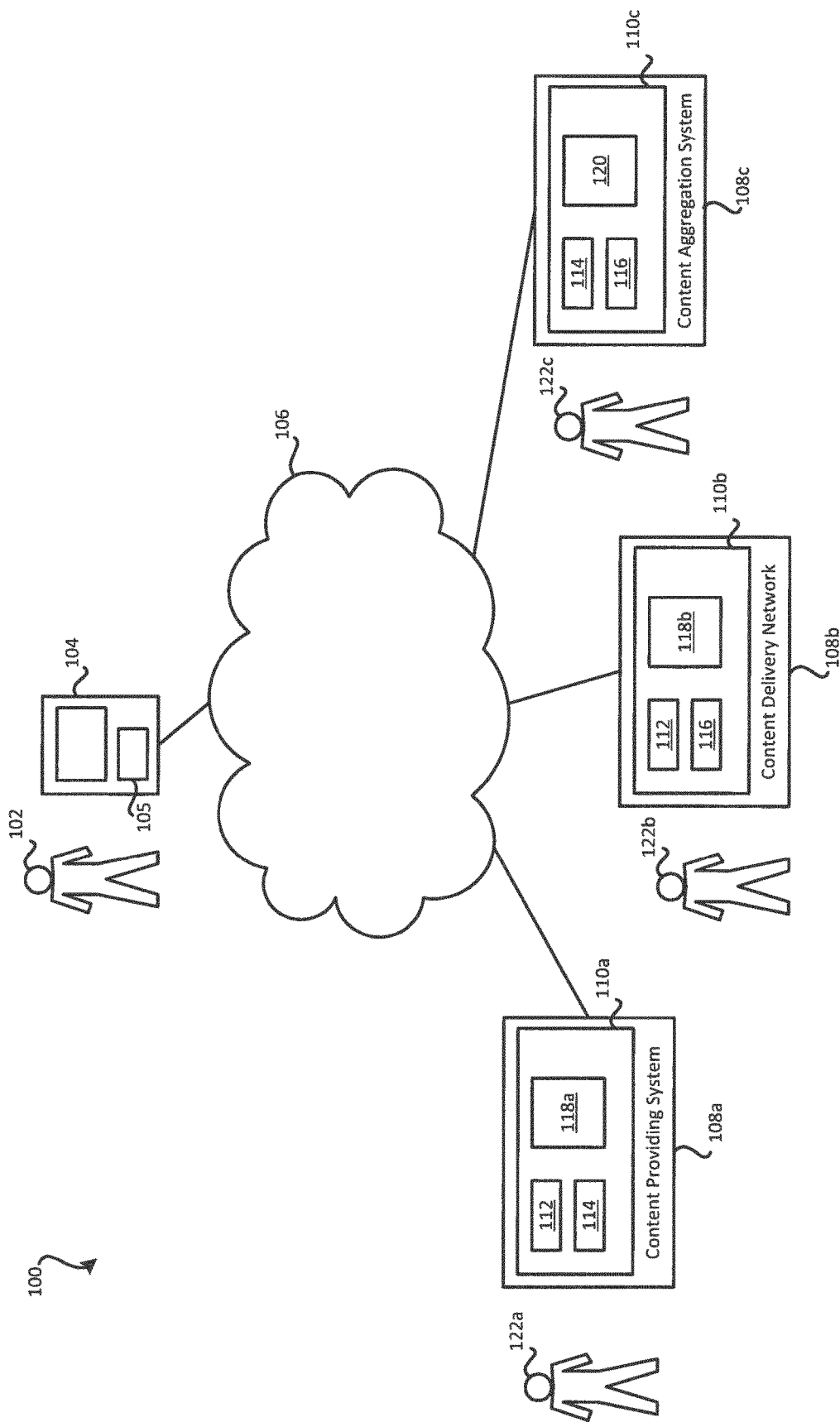
FIG. 1 is a schematic illustration of a content delivery system.

FIG. 1 shows a content delivery system 100. The content delivery system 100 comprises a user device 104, a content providing computer system 108a, a Content Delivery Network (CDN) 108b, and a content aggregation computer system 108c.

As explained in more detail below, content providing system 108a, the CDN 108b and content aggregation computer system 108c perform separate and distinct functions within the content delivery system 100. The content aggregation system 108c holds a catalogue of media content accessible to the user device 104. A user at the user device can select a media asset from the catalogue for streaming to the user device. The CDN system 108b holds the selected media asset and operates to stream that media asset to the user device as a media stream. The CDN system 108b initially obtains that media asset from the content providing system 108a, where it is held for download by the CDN 108b. The media content is DRM ("Digital Right Management") protected, and the content providing system 108a functions to issue DRM licenses required to unlock that content. For example, the media stream may be encrypted, and the content providing system 108a may hold a cryptographic key for decrypting the stream and conditionally issue that key to the user 104.

As shown in FIG. 1, a user 102 is associated with (i.e. has access to) the user device 104. The user device 104 is capable of connecting to a computer network 106. The user device 104 is a computer device in the form of, for example, a smartphone device, tablet computing device, personal computer ("PC"), smart-TV, set-top box, games console etc. The network 106 is a packet-based network such as the Internet in this embodiment but may not be packet-based in other embodiments. The network connection can be wired such as Ethernet or wireless (either WiFi or GSM), or any suitable interface which allows the user device 104 to communicate with the network 106.

The content providing computer system 108a is operated by a content provider 122a and is formed of one or more computer devices such as servers. The content providing system 108a comprises first computer storage 110a (e.g. in the form of a non-transitory computer readable medium such as electronic or magnetic memory) which holds media content and first and second contract software elements 112, 114 whose functionality is discussed in detail below. The media content held by the content providing system 108a is stored in the form of a collection of media assets 118a (that is, individual pieces of media content), each media asset being, for example, an episode of a television show, a movie, or a recording of a sports event (e.g. football match) etc.

The Content Delivery Network (CDN) is operated by a CDN provider 122b and is a computer system formed of one or more computer devices such as servers (e.g. streaming servers) for streaming media content. The CDN system 108b comprises second computer storage 110b (e.g. in the form of a non-transitory computer readable medium such as electronic or magnetic memory) which holds media content. The computer storage 110b also holds a copy of the first contract element 112 and a third contract element 116 whose functionality is discussed in detail below. The media content held by the CDN system 108b is also in the form of a collection of media assets 118b, at least some of which have been downloaded from the content providing system 108a and which correspond to at least some of the media assets 118a held at the content providing system 108a. This is discussed in detail below.

The content aggregation computer system 108c is operated by a content aggregator 122c and is formed of one or more computer devices such as servers. The content aggregation system 108c comprises third computer storage 110c (e.g. in the form of a non-transitory computer readable medium such as electronic or magnetic memory) which holds a catalogue 120 of different media assets as well as copies of the second and third contract elements 114,116. The catalogue references various different media assets and comprises information about those media assets (e.g. a verbal description of those assets, extracts of those assets e.g. clips of still images extracted from a video asset), including at least some of the media assets 118b at the CDN system 108b. For each media asset in the catalogue, the third computer storage 110c holds an association associating that media asset with a respective network identifier identifying a location in the network 106 from which that media asset can be obtained e.g. for a media asset 118b held at the CDN system 108b, a network identifier associated with the CDN system 108b such as a URL ("Uniform Resource Locator") or IP ("Internet Protocol") address mapped to that CDN system in the network 106 which can be used to access that media asset 118b. The content aggregation system 108c provides access to the catalogue 120 via the network 106 e.g. by hosting a suitable web portal.

The content providing computer system and the CDN are both examples of "content supply computer systems", and the CDN provider and content provider are both examples of "content suppliers", with the former supplying content to the latter, and the latter supplying that content to end-users (e.g. 102) as media streams, as described in detail below.

Figure 2A:
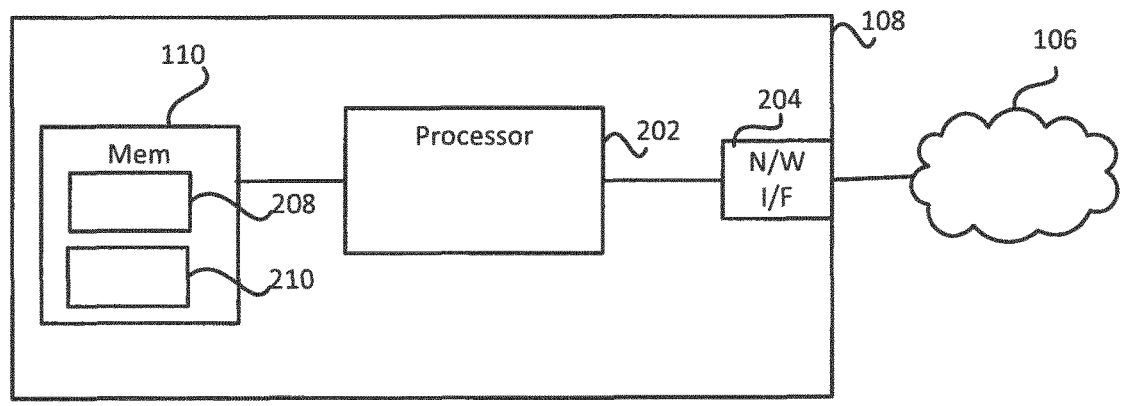
FIG. 2A is a schematic illustration of a computer system.

Further details of a computer system (e.g. 108a, 108b or 108c) are shown in FIG. 2A which is a block diagram of the computer system. For the sake of illustrations, the computer system is shown formed of a single computer device such as a server 108; however, as will be appreciated, the computer system may be formed of multiple computer devices (e.g. multiple servers), possibly distributed across multiple locations (e.g. multiple geo-locations). For instance, in practice, the Content Delivery Network 108b may comprise multiple streaming servers distributed globally across multiple geo locations to provide streaming services to users across the globe.

The server 108 comprises at least one processor 202 in the form of one or more CPUs, a network interface 204, and computer storage (memory) 110 (e.g. 110a, 110b or 110c) which may be in the form of a non-transitory computer readable medium such as electronic or magnetic memory. The processor is connected to the network interface 204 to allow data to be transmitted to and received from the network 106 by the server 108. The computer storage 118 is connected to the processor 202 and holds for execution on the processor and data (e.g. the media assets 118a or 118b, or the catalogue 120).

More specifically, the memory 110 holds contract execution environment code 208 configured, when executed on the processor 202, to provide a "contract execution environment". The memory also hold one or more executable contract software elements 210 (e.g. 112, 114, 116)—alternatively referred to herein as "contract elements"—for execution within the contract execution environment.

As known in the art, an execution environment is a software computing resource which itself provides a service to host and execute other executable software elements.

Here, the contract execution environment 208 is an environment in which instances of the executable contract software elements 210 (e.g. 112, 114, 116) can run—that is, the contract execution environment acts as a software container for contract software element instances (referred to as "contract instances" herein). The contract instances are thus nested in the contract execution environment, which itself may be nested (i.e. contained) in other execution environments, such as an operating system running on the processor 202.

As explained in more detail below, each contract software element is a self-contained piece of computer software embodying a contractual relationship (contract) between two parties (e.g. two of the content provider 122a, the CDN provider 122b and the content aggregator 122c).

Executable, software-embedded contracts, otherwise known as "smart contracts" are known in the art and constitute computer protocols that, in general, facilitate, verify, or enforce the negotiation or performance of a contract. Smart contracts may have a user interface and may emulate logic of contractual clauses so as to be effectively 'self-enforcing'.

The present disclosure provides a new, high-level "contract meta-language" (which can be viewed as a higher-level computer programming language), tailored to a media streaming content, which is discussed in detail below. The contract elements of the described embodiments are written in this high-level meta-language.

The contract elements map expected "activation conditions" to necessary actions to be performed in response to those actions in order to fulfil the embodied contractual obligations. These mappings are expressed in the software elements using the higher-level meta-language, which the contract execution environment can interpret and map to lower-level operations to be performed by the processor 202 on-the-fly whenever an expected activation condition occurs to effect the corresponding necessary action.

Figure 2B:
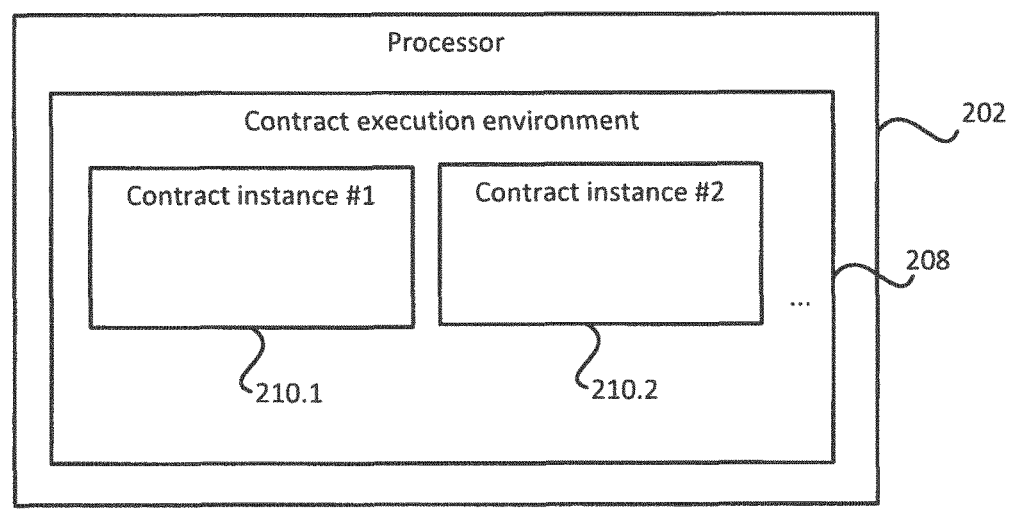
FIG. 2B is a schematic illustration of a contract execution environment.

This is illustrated schematically in FIG. 2B, which shows the processor 202 executing the contract execution environment code 208, thereby providing a contract execution environment in which contract instances 210.1, 210.2 of contract elements 210 can run. That is, the contract instances 210.1, 210.2 are shown running within the contract execution environment 208.

Figure 2C:
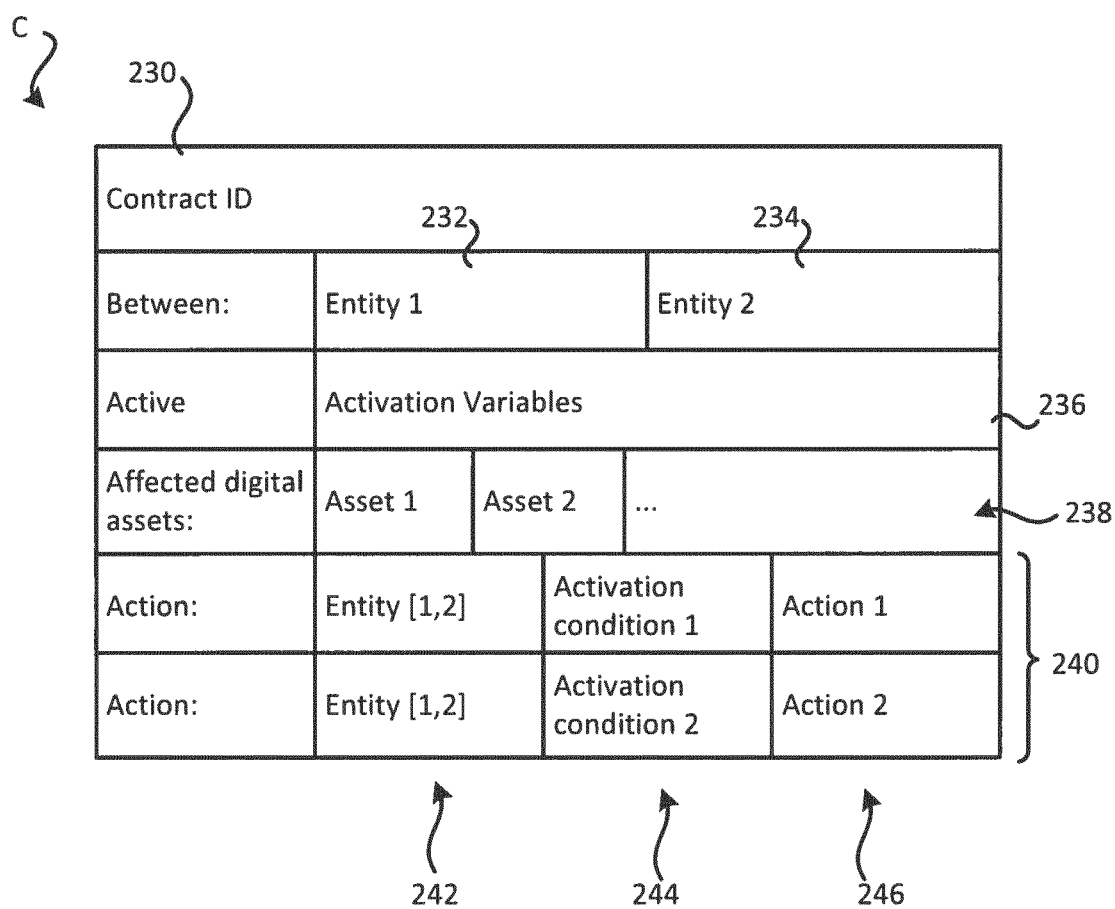
FIG. 2C is a schematic illustration of a contract software element.

FIG. 2C is a schematic illustration of an exemplary stored contract element C (i.e. one of the contract elements 210 held in computer storage 110 e.g. 112, 114, 116) embodying a contract between first and second entities (e.g. any two of the content provider 122a, the CDN provider 122b, and the content aggregator 122c). As shown in FIG. 2, the contract element comprises first and second entity identifiers 232, 234 of the first and second entities which uniquely identify those entities within the system 100. The contract C also comprises a contract identifier 230 uniquely identifying the contract within at least the first and second entities computer systems.

The contract element C also comprises one or more activation variables 236 which define at least one duration over which the contract is active (e.g. in terms of an activation time and an expiration time). The contract element C also comprises one or more asset identifiers of media assets to which the contract relates and which are covered by the contractual agreement. The contract element 240 also defines one or more necessary actions 240 that have to be performed to fulfil the contract. For each such necessary action, the contract element comprises an associated entity identifier 242 (either the first or second entity identifier) identifying which entity (that is, whose computer system) must perform that action, one or more associated activation conditions 244 responsive to which that action is to be performed, and a identifier 246 of the action itself.

In order to establish an interface between two computer systems (e.g. 108a, 108b, 108c) in the content delivery system 100, by which those computer systems can interact with one another, a contract element (e.g. 112, 114, 116) embodying a contract between the operators of those systems (e.g. 122a, 122b, 122c) is generated, and respective instances of the generated contract element are created in the contract execution environments of each of the two systems. All communication between those computer systems is subsequently effected by way of the established interface (that is, all communication between those systems is mediated by the contract element instances running at those two computer systems), which functions as a peer-to-peer-based interface between those computer systems.

Each instance of a contract software element functions as an independent "software agent". Agent-based computing is known in the art (and is described, for instance, in Jennings, N. "Agent-based computing: Promise and perils", In Proceedings of the 16th International Joint Conference on Artificial Intelligence, 1999, Vol. 16, pp. 1429-1436). A software agent is an autonomous computer program that carries out tasks on behalf of users (here end-users 102 or operators 122a, 122b, 122c) in a relationship of agency. In acting as a software agent, each contract software instance functions as an autonomous software entity which runs substantially continuously over an interval of time (as opposed to being executed on demand; that is as opposed to being executed only when required to perform some specific task), awaiting activation conditions which, when detected, trigger necessary actions. In running continuously over the interval of time, that instance runs monitors for activation conditions throughout that interval i.e. continuing to run even between activation conditions in that interval or if no activation conditions are detected in that interval.

Further, in acting as software agents, different contract instances e.g. running in in different systems (e.g. 108a, 108b, 108c) communicate with one another independently from the operators of those systems (e.g. 122a, 122b, 122c) to automatically coordinate the performance of tasks (such as user verification, media asset transactions, and instigating streaming of a requested media asset—see below).

The computer storage 118 may also hold additional code not shown in FIG. 2A, such as code for generating contract software elements (see below). In embodiments, the software system could provide some pre-defined contracts representing the most common and standardized interactions which can be completed with entity identifiers of the relevant entities. Embodiments also a provide ways to create new contracts.

Returning to FIG. 1, the user device 104 executes a media client application 105 which enables the user device 104 to communicate with the servers 110a, 110b and 110c via the network 106. In particular, the user 102 can access the catalogue 120 of media assets from the user devices 104 using the application 105 e.g. as part of a process of instigating, from the CDN server 108b, streaming of a media asset that is referenced in the catalogue 120 held at the content aggregation server 108c.

Figure 3:
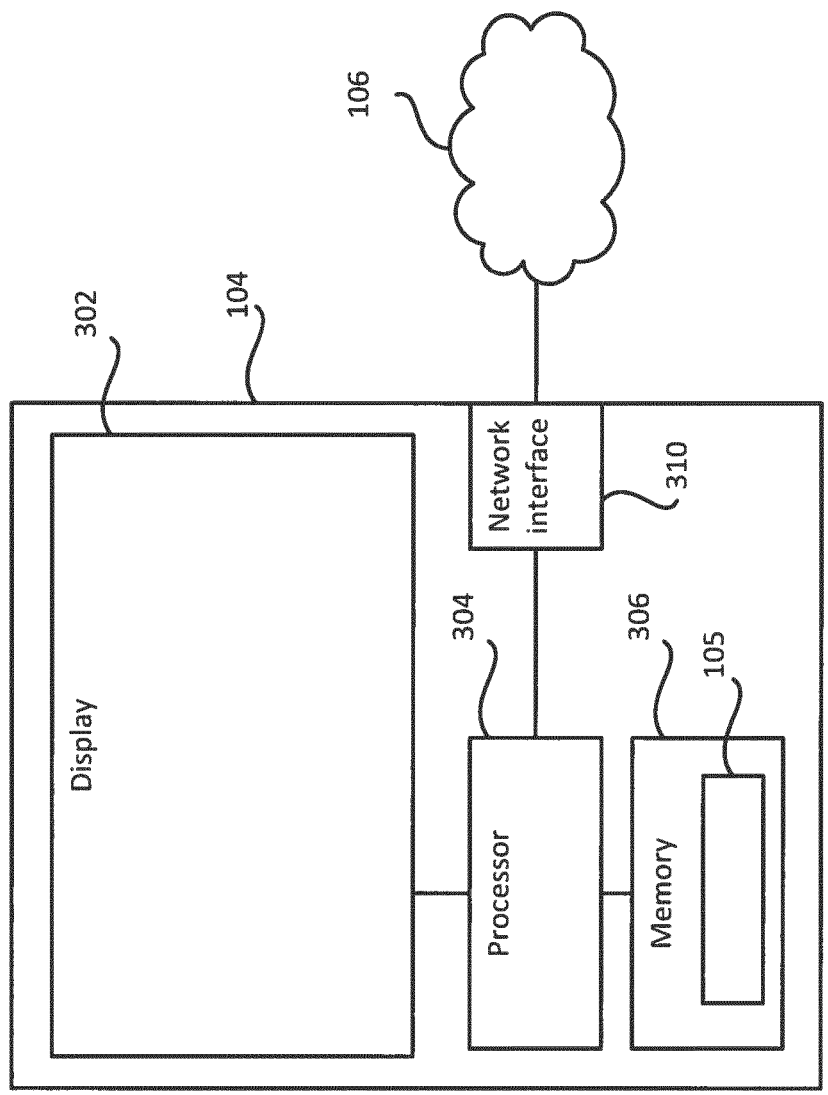
FIG. 3 is a schematic illustration of a user device.

Further details of the user device 104 are shown in FIG. 3 which is a schematic block diagram of the user device 104.

As shown in FIG. 3, the user device 104 comprises a network interface 310 for connecting to the network 106, a processor 304 in the form of one or more Central Processing Units ("CPUs"), a memory (computer storage) 306, and a media output device in the form of a display screen 302. The memory 306 is connected to the processor 304 and stores software in the form of program code for execution on the processor 304 which includes operating system code for managing hardware resources of the user device 104 and applications which cause the user device 104 to perform useful tasks above and beyond the mere running of the user device itself. The applications include a media application 105. The processor 304 is connected to the screen 302 to allow the screen to display media content and other information to the user 102. The processor is connected to the network interface 310 to allow data to be transmitted to and received from the network 106. The screen may be a touchscreen configured to also receive inputs from the user 102 and is thus also an input device of the user device 104. Alternatively the screen may not be a touch screen and/or the user device may comprise alternative input devices such as a keyboard, mouse, television remote control, camera or infra-red depth sensor able to detect gesture commands, biometric sensor(s) etc. The screen, network interface and memory may be integrated into the user device 104. Alternatively, one or more of these components may not be integrated and may be connected to the processor via a suitable external interface (e.g. cabled interface such as USB or wireless interface such as Bluetooth or other wireless interface). For instance, the screen may be an external screen connected to the processor via a SCART, RCA or other similar interface.

The media application 105 has a user interface for presenting information (e.g. visual information) to the user via one or more output devices (e.g. the display screen 302) of the user device 104 and to receive information from the user via one or more input devices of the user device 104. The user interface thus acts as both an output interface and an input interface of the user device 104.

The content delivery system 100 can be considered a media streaming system arranged as a distributed autonomous organization. In the exemplary embodiments described herein, the system constitutes a video streaming system.

The disclosed video streaming system 100 is a software-based system designed in the form of a distributed autonomous organization, namely a system comprising a set of independent but interrelated specialized entities without centralized controlling parties. The proposed system requires that the parties intending to play a role in the system (e.g. the content provider 122a, the CDN provider 122b, the content aggregator 122c, and the user 102) formalize business relations with related entities by means of formal contracts, which are embodied in contract software and thereby automatically enforced by that contract software when executed.

Figure 7:
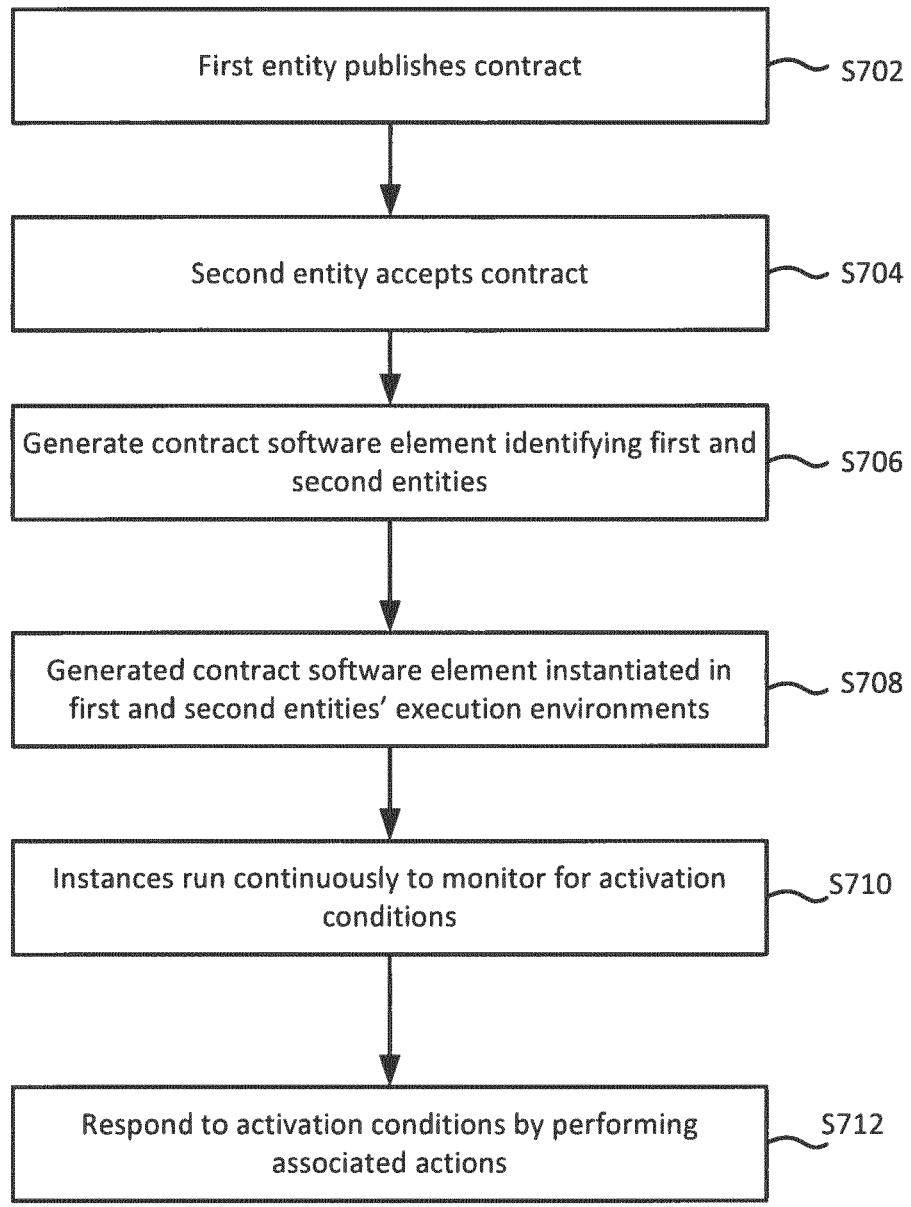
FIG. 7 is a flowchart for a method of establishing an interface between entities of a content delivery system.

A method of establishing an interface between different computer systems (e.g. 108a, 108b, 108b) in the content delivery system 100 will now be described with reference to FIG. 7, with is a flow chart for the method.

Each entity publishes the type of contracts that they intend to fulfil; any other entities can enter into a business relation with them if the obligations stated in those contracts are accepted.

At step S702 a first entity (e.g. one of 122a, 122b, 122c) publishes information about a contract (i.e. contractual agreement) that they intend to fulfil i.e. an offer of a contract. This may, for instance, be a verbal description of terms of the contract in human-readable form so that another entity (e.g. another of 122a, 122b, 122c) can decide whether or not they are willing to accept that contract.

At step S704 a second entity (e.g. another of 122a, 122b, 122c) accepts the contract offered by the first entity by instigating a contract element generation request to first entity's computer system (e.g. 108a, 108b or 108c).

At step S706, contract element generation code running at the first computer system generates a contract element (e.g. 112, 114, 116) embodying the contract between the first and second entities and comprising, among other things, entity identifiers of the first and second identifiers.

At step S708, the generated contract element is instantiated in both the first and second entities' contract execution environments running at their respective computer system, thereby creating separate instances of the contract software element at each of those computer systems. The created instances run continuously (S710) over an interval of time to monitor for activation conditions.

As indicated above, this establishes an interface between those communication systems, by which they can interact i.e. by any one of the instances instigating activation conditions (in the form of requests directed to the other instance) which the other is configured to respond to (by performing an associated necessary action)

Contract elements, in addition to a description of impacted items (media assets 118a, 118b in this case) and conditions for using them, such as associated royalty fees, also include a number of procedures that are automatically executed by the streaming system when activated by appropriate stimuli or requests (activation conditions). These procedures actually enforce the conditions stated by the contracts: the overall system behaviour of the streaming system 122 is therefore determined by the execution of the procedures specified by contracts.

In other words, within the streaming system 100, a contract between two parties operating their own computer systems is embodied in a contract element (e.g. the first, second and third contract software elements 112, 114, 116 mentioned above). The embodied contract defines a formal contractual agreement between the two parties in terms of permitted interactions of those parties' respective computer systems. The contract is enforced automatically by each party instantiating the contract element on their respective computer system, with the contract element instances functioning to mediate all interactions between those computer systems in a peer-to-peer fashion to ensure that only permitted interactions take place (thereby automatically effecting the formal contractual agreement between the parties themselves in an autonomous fashion without an significant manual oversight).

At step S712, the created instances perform necessary operations specified in the generated contract element responsive to associated activation conditions also specified in that contract element, thereby automatically enforcing the contractual agreement entered into by the two entities with no (or at least) minimal oversight required by the operators themselves. The activation conditions may be time-based, or they may be request(s) instigated from one instance to the other (see below).

The streaming system is thus designed in such a way that the enforcement of mutual obligations among the parties defined by the contracts is an intrinsic feature of the system. This is desirable for a distributed organization without a centralized ruling authority. The decentralized video system is particularly well suited for use by independent producers and niche video producers that are currently ruled out by the leading on-demand video streaming services, and enables users (in this case, viewers) to freely choose among the different offers available in full compliance with the rights of each stakeholder in the system.

This is in contrast to the current scenario of video streaming services, which is dominated by highly centralized systems under the control of few providers. This can be observed both for on-demand streaming services based on pay models as well as for advertising-based video services. The domain of on-demand streaming services based on pay models is dominated by large providers, such as Netflix, that can license movies and TV series from major Hollywood studios and thus providing a large video catalogue to their viewers in multiple countries. A similar approach has been adopted worldwide by broadcasters and telecom operators that have extended their traditional digital terrestrial, satellite or IPTV offering with the so called over-the-top (OTT) services, addressing either existing subscribers, non-subscribers or both. In all these cases, each of these providers has licensed blockbuster contents from the main content producers and then has built a proprietary, expensive and complex software system for the distribution of these contents to their viewers. Similarly, advertising-based video services are dominated by giants such as YouTube operating complex, highly centralized, proprietary systems.

Disadvantages of the current scenario thus include the high costs and effort required to build and run such complex systems (as well the costs of licensing content).

In this scenario, in particular, it is not viable for small content aggregators (with deep domain knowledge on vertical segments but limited resources), small independent video producers and niche content producers to provide access to media content streams due to the cost and complexity involved.

An objective of the disclosure is to provide a video streaming service in the form of a Distributed Autonomous Organization (DAO). The disclosed DAO is particularly, though not exclusively, suitable for small content aggregators and small content providers with limited resources as they need only minimal computer and network resources to be able to operate effectively within the distributed system. The DAO has the following characteristics:

composed by a number of independent and specialized constituents, related each other by means of formalized contracts, such as contracts between content providers and content aggregators or contracts between content aggregators and users (e.g. viewers);

all functions provided by the video streaming software system are mediated and controlled by the existing contracts among the parties;

there is no centralized party in charge to guarantee the enforcements of the rules described in the contracts, this is implicitly achieved by the system;

The system presented builds on work in the existing domains of Multi-agent distributed systems (as described e.g. in Wooldridge, Michael. "An Introduction to Multi-Agent Systems", John Wiley & Sons, 2002), agent-based computing (as described e.g. in Jennings, N. "Agent-based computing: Promise and perils", In Proceedings of the 16th International Joint Conference on Artificial Intelligence, 1999, Vol. 16, pp. 1429-1436) and Open Distributed Processing (as described e.g. in P. F. Linington, Z. Milosevic, A. Tanaka and A. Vallecillo, "Building Enterprise Systems with ODP—An Introduction to Open Distributed Processing", Chapman & Hall/CRC Press, Sep. 2011).

In particular, the disclosure builds on the work described in M. Rouached, O. Perrin and C. Godart. "A Contract Layered Architecture for Regulating Cross-Organisational Business Processes", BPM 2005, Springer, 2005, pp. 410-415 ("Rouached" herein after), where it is presented a layered architecture for business processes consisting of a business entities layer, a business actions layer and a business rules layer. Those three layers are coordinated by an event-based interaction mechanism entailing a dispatching and coordination paradigm based on contracts.

The video streaming system of the present disclosure is designed by clearly separating the roles of the entities that takes part in the video streaming system (e.g., content providers, CDN providers, content aggregators, and users e.g. viewers), such that each of them can focus on their specialty or need. As indicated above, the disclosed video streaming system requires that the parties intending to play a role in the system formalize business relations with related entities by means of formal contracts. Therefore, each entity that intends to play a role in the system will publish the type of contracts that it intends to fulfil and any other entity can enter into a business relation with it only after they have subscribed to obligations stated in those contracts. A contract may be, for instance, a combination of declarative conditions, such as suggested retail price for a media asset (e.g. movie) or an expected royalty fee due to content producers, and a set of procedures that, when executed, can automatically enforce the stated conditions.

Operationally, contracts can be considered a set of procedures that are automatically executed by the system when activated by appropriate stimuli; all interactions among the parties are mediated by those procedures and hence by the associated contracts. The overall system behaviour is therefore determined by the execution of the procedures contained in those contracts.

In contrast to the "Rouached" reference mentioned above, the present disclosure does not define a general model for actionable contracts applicable to different and disparate application domains, rather, the present disclosure considers a content delivery system having that is tailored to streaming of media assets specifically.

The design of the disclosed system covers all the aspects necessary to guarantee that each entity is properly rewarded automatically and that videos are watched in full compliance with the rights of each stakeholder in the system automatically. The automatic enforcement of the mutual obligations among the parties defined by the contracts is an intrinsic feature of the system that has been designed as this is desirable for a distributed system without a centralized ruling authority as this one. The video streaming system is designed as an open network where entities can freely join by selecting a role they intend to play and by entering into agreements with respective counterparts. The software system implementing the network provides basic building blocks, in the form of basic operations (atomic operations) specific for the media streaming domain (particularly, but not exclusively, the video streaming domain) such as the functions for moving and streaming videos or for updating and checking user entitlements, as well as pre-defined contracts combining the basic operations into permitted higher-level domain-specific processes.

In embodiments, the video streaming system is in the form of a pay-based service permitting viewers to search for a video from a catalogue published in a dedicated portal/application and to stream DRM ("Digital Rights Management") protected videos to their devices.

In embodiments, the ecosystem behind the video streaming system comprises the following entities:

Content providers. These are entities whose main objective is the production of video contents (media assets). The physical assets corresponding to their video production are made available to CDN Providers that will be in charge to actually stream them to Viewers; furthermore, Content Providers will also establish a formal, contractual relation with Content Aggregators which will create and manage video services for the benefit of Viewers. As part of this formal relation, a Content Provider will give the right to a Content Aggregator to use the video in their video portal/application and will define any royalties related to video consumption. Content Providers create the digital video assets in an encrypted format, such that there is a way for them to control their distribution by means of DRM systems. In various embodiments, Content Providers are ultimately responsible for releasing DRM licenses (a form of digital license) to viewers.

CDN providers. CDN providers enter in a formal, contractual relation with Content Providers. The CDN Providers are in charge of downloading the assets produced by Content Providers, storing these assets in their servers, and streaming them to the users (e.g. viewers). CDN Providers also enter in a formal, contractual relation with content aggregators that will use their streaming services in their video portal; this entails an agreement on a price for the streaming services offered by CDN providers.

Content aggregators. They are the ultimate responsible of creating a video portal/application where viewers can browse the catalogue containing the videos that the content aggregator has licensed from content providers. Content aggregators define a sell price for each media asset and enter into a formal, contractual relation with the users who will use the portal/application developed by Content Aggregators.

Users (e.g. viewers). These are the end-users who can search the catalogue that content aggregators have assembled and who can buy and play the catalogued assets.

Figure 4:
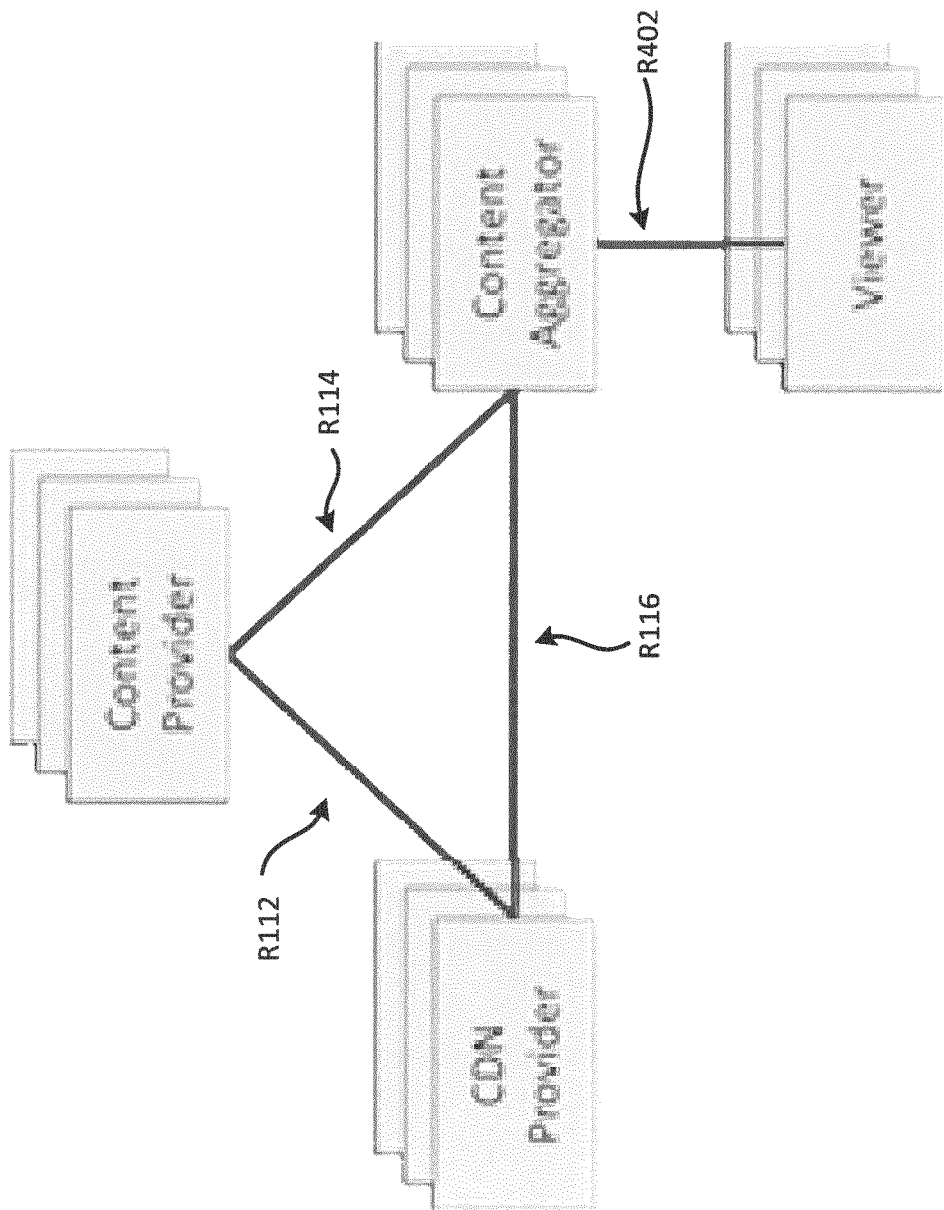
FIG. 4 is a schematic illustration of relationships between entities in a content delivery system.

FIG. 4 shows formal relations established between the parties involved. In this example, the parties are the content provider 122a, the CDN provider 122b, the content aggregator 122c, and the user 102 of FIG. 1. As shown in FIG. 4, the following formal relations are established: a formal relation (labelled R112) between the content provider 122a and the CDN provider 122b; a formal relation (labelled R114) between the content provider 122a and the content aggregator 122c; a formal relation (labelled R116) between the CDN provider 122b and the content aggregator 122c; and a formal relation (labelled R124) between the content aggregator 122c and the user 102.

As will be appreciated, for the sake of illustration, FIG. 4 is a simplification with respect to a real situation where other entities are possibly involved such as third party metadata providers or encoding/transcoding providers. As will be apparent, the presented scenario can be easily extended to a more complex and realistic situation.

As mentioned, the video streaming system 100 functions as a distributed organization regulated automatically by contracts embodied in contract software.

More specifically, the relations R112, R114, R116 and R402 depicted in FIG. 4 are formalized by means of respective contract elements embodying contracts between the relevant parties. Contract elements define any involved entities, a validity period, possible items that are affected by the contract and any procedures that have to be executed to enforce the obligations stated by the contract itself.

The contract formalizing the relation R112 between the content provider 122a and the CDN provider 122b is embodied first contract element 112 copies of which are held at the content providing system 108a and the CDN 108b respectively. The contract formalizing the relationship R114 between the content provider 122a and the content aggregator 122c is embodied in the second contract element 114, copies of which are held at the content providing system 108a and the content aggregation system 108c respectively. The contract formalizing the relation R118 between the CDN provider 122b and the content aggregator 122c is embodied in the third contract element 116, copies of which are held at the CDN 108b and the content aggregation system 108c respectively. The relationship R402 between the user and the content aggregator is embodied in a further contract element (not shown) held at the user device and the content aggregation system embodying a contract between the viewer and the content aggregator. The copy held at the user device may be embedded in the client 105.

System behaviour of the system 100 is defined by contracts. When a contract is accepted by the parties and after it becomes effective, the associated contract element procedures become active and when the activation conditions are verified, the procedures are automatically executed by the system for enforcing the associated obligations.

As mentioned above, to aid readability, the term "contract" (resp. "contract instance") will sometimes be used as shorthand to refer to a contract element embodying that contract (resp. an instance thereof running in a contract execution environment)—this will be apparent from the context in which the term is used.

When a contract is agreed by two parties, each party's computer system will have its own instance of that contract running in its execution environment, waiting for the appropriate activation conditions.

That is, when a contract is agreed by two parties, each instantiates the contract software element embodying that contract in the respective contract execution environments of their computer systems. The contract defines agreed mutual obligations of the two parties which are embodied in the contract software element in terms of permitted interactions of their computer systems i.e. in terms necessary operations to be performed by the computer systems in response to associated expected activation conditions. Once created, the contract instances mediate all interactions of those systems to automatically ensure that only permitted interactions take place (i.e. to ensure that the necessary operations, and only the necessary operations, are performed in response to the expected activation conditions).

The activation conditions are of two types: time-based or explicit requests. A time-based activation is determined, for instance, by the validity period of the contract: this may happen either when the contract expires and hence some actions must be executed for clean-up, or when the contract becomes effective or, again, periodically at pre-defined time intervals. Explicit requests sent to an entity by other entities can also activate actions, for instance, a request from a viewer to buy a video will activate a chain of actions involving, at least, the content aggregation system 108c and the content providing system 108a. A particular request that an entity can only send to itself is a request to terminate a contract.

Specific examples will now be described for the purposes of illustration. A formally defined contract meta-language is used for describing contracts, which is illustrated by way of the examples below. "Atomic operations" are represented in the contract meta-language as "method.run (*)"—that is as primitive operations (method) to be performed as a function of specified variables (*).

As indicated, contracts are executed by each party and interact by means of requests exchange. Once a contract is accepted by both parties it becomes active and is installed (that is, contract software embodying that contract is instantiated by both parties) in a contract execution environment of the respective computer systems of each of the entities mentioned in the contract. The respective active contract instance running in the contract execution environment of each entity's computer system intercept any incoming requests directed to that computer system and verify if these requests are preconditions (activation conditions) for actions defined in some of these contracts. If this is the case, the corresponding actions are executed; these actions could then generate new requests addressing the same (i.e. the requesting) system or other entities' computer systems, or could imply execution of atomic operation(s) implemented in the system; an example of an atomic operation is the verification of the entitlement of a viewer made by a content aggregator when a viewer requests a play (recall, these atomic operations are represented in the contract meta-language as method.run ( ) e.g. as in verifyEntitlement.run (x,v)). Exchanging of requests (also known as message passing) between the different computer systems involved (e.g. 108a, 108b, 108c, 102) and the execution of the atomic operations defines the behaviour of the overall video streaming system 100.

That is, contract software instances mediate all interactions among the parties' computer systems (e.g. 108a, 108b, 108c, 102) such those instances actually enforce any obligations agreed by the parties themselves (e.g. 122a, 122b, 122c, 104), thus requiring minimal oversight from the parties themselves. In embodiments, other forms of direct interactions among the parties may be prevented altogether.

When a contract expires, the corresponding contract software instances are removed from the relevant contract execution environments.

A contract has a local storage area that is accessed only by the actions within that contract; the contract execution environment has then a global storage area that is accessed by all contracts.

Returning to FIG. 1, the first contract element 112 embodies a content provider-CDN provider (CP-CDN) contract defining permitted content provider computer system-CDN interactions. In agreeing the CP-CDN contract, the contract provider 122a (CP1) and the CDN provider 122b (CDNP1) instantiate respective instances of first contract element 112 at their computer systems 108a, 108b. These instances then operate to automatically enforce the CP-CDN contract as between the content provider 122a and the CDN provider 122b to ensure that all necessary operations are performed by the computer systems 108a, 108b.

For example, a first CP-CDN contract, as between the contract provider 122a (CP1) and the CDN provider 122b (CDNP1), may be embodied as a first contract element 112 having the following format:

```
Contract C1
    Entity: CP1
    Entity: CDNP1
    EffectiveDate: April 9, 2014
    ExpirationDate: April 8, 2015
```

```
ExpirationGracePeriod: 5 days
affectedItems:
    ( Owner: CP1
      Title: "Dear Anny"
      AssetName: DearAnny.mdp )
    ( Owner: CP1
      Title: "Vanity"
      AssetName: vanity.mdp )
Action:
    Entity: CDNP1
    Stimulus: whenActive
    Effect: Send downloadItems(affectedItems) To CP1
Action:
    Entity: CP1
    Stimulus: Received downloadItems(affectedItems)From
CDNP1
    Effect: allowDownload.run(affectedItems)
Action
    Entity: CDNP1
    Stimulus: whenExpires
    Effect: removeItems.run(affectedItems)
```

The above CP-CDN contract has an associated contract identifier "CP1" which corresponds to the contract identifier 230 of FIG. 1C. The contract C1 defines CP1 (122a) and CDNP1 (122b) as two entities involved in this contract. This corresponds to the entity identifiers 232, 234 in FIG. 2C. In the above "x" denotes a user (here, a viewer) identifier and "v" denotes an asset identifier of a media asset (here, a video).

It should be noted that the necessary operations defined in the first contract element are automatic operations effected by instantiating the first contract element in the contract execution environments of the content provider computer system and the Content Delivery Network 108a, 108b. The automatic operations performed by the instance executed at any one of those computer systems are triggered automatically either in response to temporal triggers or in response to requests that have been instigated automatically by the instance executed at the other of those computer system.

Figure 8:
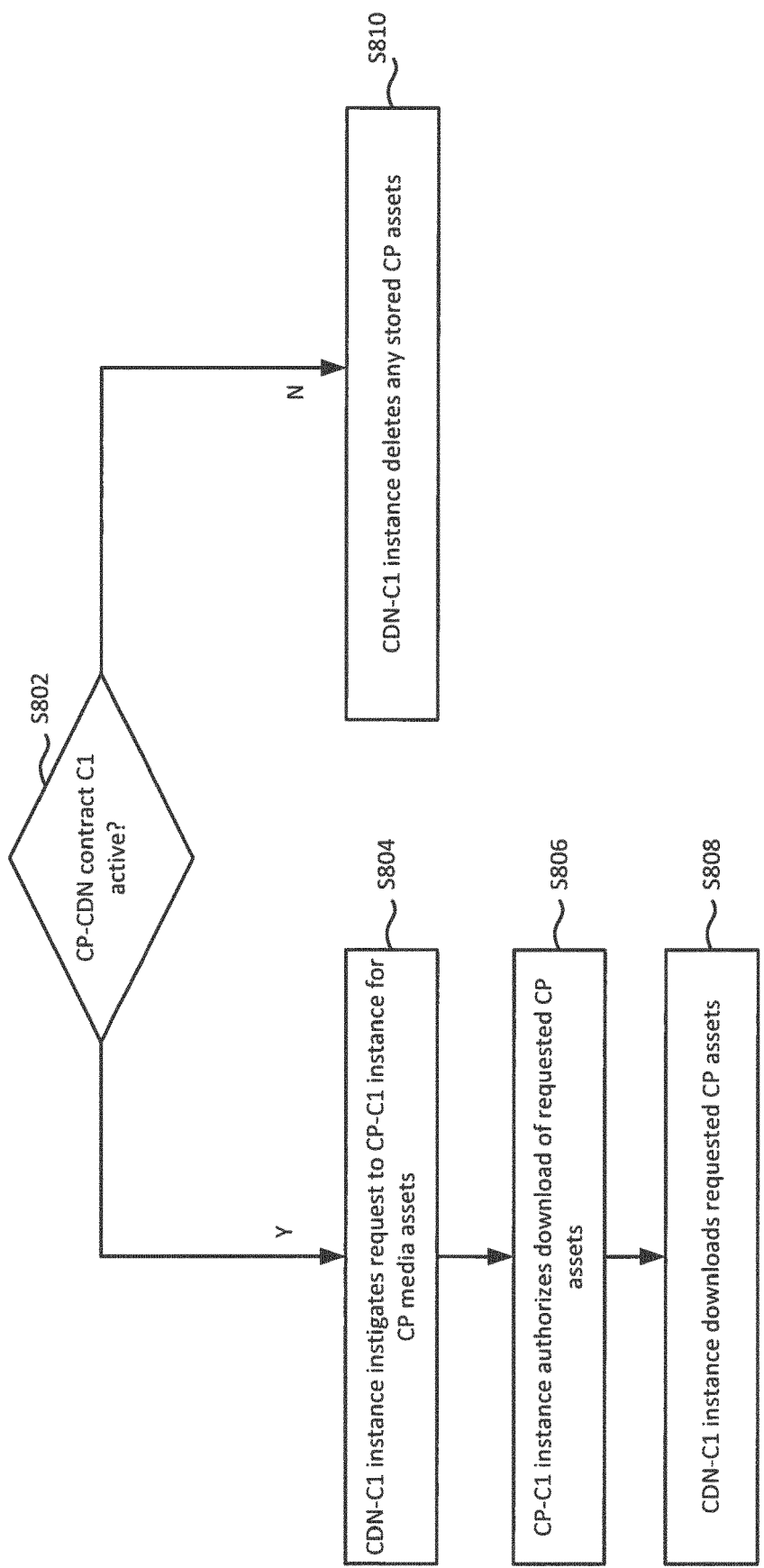
FIG. 8 is a flowchart for a method of regulating interactions between entities of a content delivery system.

A method of regulating interactions between a content provider computer system 108a and a Content Delivery Network 108b will now be described with reference to FIG. 8, which is a flowchart for the method. The method of FIG. 8 represents functions that are collectively performed by the instance of the contract C1 running in the contract execution environment of the content provider's system 108a (CP-C1 instance) and the instance of the contract C1 running in the contract execution in environment of the CDN 108b (CDN-C1 instance).

Figure 5:
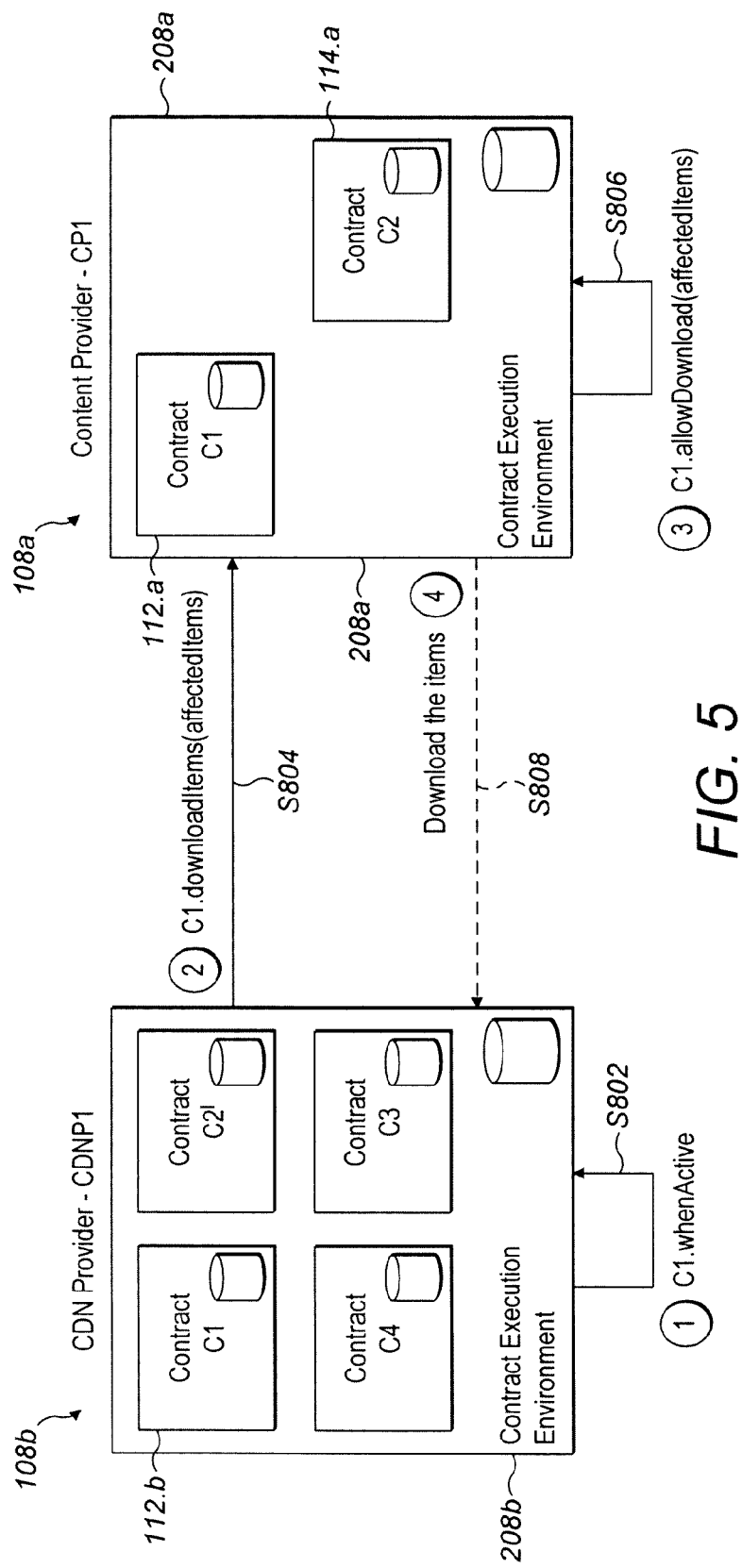
FIG. 5 illustrates interactions between entities of a content delivery system.

A graphical representation of requests generated and exchanged between CP1 and CDN1 when the contract C1 becomes effective (that is, in performing the method of FIG. 8), are shown in FIG. 5. Requests are shown as solid arrows and responses to those requests as dashed arrows. The signal flow if FIG. 5 is labelled to illustrate the corresponding method steps of FIG. 8.

This corresponds to the execution by CDN1 (by the CDN-C1 instance 114b.1) of the action for downloading the assets made available by CP1 (that is, by the CP-C1 instance 114b.1).

As shown in FIG. 5, the CP-C1 instance (labelled 112.a/C1 in FIG. 5) of C1 runs in the contract execution environment 208.a of the content providing system 108a. The CDN-C1 instance (labelled 112.b in FIG. 5) runs in the contract execution environment 208.b of the CDN 108b. Other contracts e.g. with other entities are also shown in FIG. 5 for the sake of illustration. In this example, the CDN executes four contract instances C1-C4 e.g. with four different entities. The content provider executes two contacts C1, C2' e.g. with two different entities. The contract C1 also defines effective date and expiration data variables EffectiveDate and ExpirationDates which define a date from which the CP-CDN contract is effective and a natural date at which it expires and which thus collectively define a validity period of the contract C1, whilst an expiration grace period variable ExpirationGracePeriod defines an agreed period of time after the natural expiration where the contract is still running (this is normally used to consider a delay in renewal of the contract C1). These correspond to the activation variables 236 in FIG. 20. When the expiration is approaching, the software system will automatically warn the involved entities CP1 and CDN1.

At step S802, it is determined by the contract instances determined whether or not the contract C1 is currently active based on the activation variables in C1.

When contract C1 becomes effective, it defines that CDN Provider CDNP1 (122b) can download from Content Provider CP1 (122a) media assets (DearAnny.mdp, vanity.mdp) defined in an affected items variable affectedItems. These correspond to the asset identifiers 238 in FIG. 2C.

The contract C1 defines various actions (corresponding to the actions 240 in FIG. 2C) that formalize the following behaviours: a first action related to entity CDNP1's commuter system 108b is activated as soon as the contract becomes effective and comprises sending a request to CP1's computer system 108a for downloading the media assets defined in the affected items variable.

Thus, if the contract is determined to be active at S802, the method proceeds to step S804, at which the CDN-C1 instance instigates a request to the CP-C1 instance for the videos identified in the contract CP2.

A second action, defined by the same contract C1, is activated when CP1's computer system 108a receives a download request from CDNP1 for the media assets defined by the contract and comprises allowing the requested download.

Thus, at step S806 the CP-C1 instance authorizes the requested download of the identified assets and at S808 the CDN-C1 instance effects a download of those assets from the first computer storage 110a to the second computer storage 110b in response.

A third action, defined by the same contract C1, is activated when the contract expires and comprises CDNP1's computer system removing the downloaded media assets.

Thus, if it is determined at S802 that the contract C1 is not active, the method proceeds to step S810, at which the CDN-C1 instance deletes removes from the second computer storage 110b any media assets downloaded from CP1 and covered by the contract C1 if present.

A more complex contract is a second content aggregator-content provider (CA-CP) contract defining a relationship between the content provider 108a (CP1) and the content aggregator 108c (CA1), which may be embodied as a second contract element 114 in the following format:

```
Contract C2
    Entity: CP1
    Entity: CA1
    EffectiveDate: March 2, 2014
    ExpirationDate: March 1, 2015
    ExpirationGracePeriod: 5 days
    affectedItems:
        ( Owner: CP1
```

-continued

```
        Title: "Dear Anny"
        SuggestedRetailPrice: $2.99;
        Fee: $1.2 per view
        Keywords: romantic, family
        AssetName: DearAnny.mdp)
        ( Owner: CP1
        Title: "Vanity"
        SuggestedRetailPrice: $2.99
        Fee: $1.2 per view
        Keywords: action
        AssetName: vanity.mdp)
    Action:
        Entity: CA1
        Stimulus: Received Buy(v) From Viewer(x)
                    Where oneOf(v, affectedItems)
        Effect: IF verifyBuyRequest.run(x,v) THEN
                    Send chargeCost(cost(v)) To x
                    updateEntitlement.run(x, v)
                    Send payRoyaltyFee(v.fee) To CP1
                    Send updateEntitlement(x, v) To CP1
    Action:
        Entity: CA1
        Stimulus: Received Play(v) From Viewer(x)
                    Where oneOf(v, affectedItems)
        Effect: IF verifyEntitlement.run(x, v) THEN
                    returnVideoURL.run(v, MakeProxy(x, v, CA1))
    Action:
        Entity: CP1
        Stimulus: Received payRoyaltyFee(f) From CA1
        Effect: chargeRoyaltyFee.run(f)
    Action:
        Entity: CP1
        Stimulus: Received updateEntitlement(x, v) From CA1
        Effect: updateEntitlement.run(x, v)
    Action:
        Entity: CP1
        Stimulus: Received getDRMLicense From Viewer(x)
                    With Proxy(x, v, CA1)
        Effect: IF verifyEntitlement.run(x, v) THEN
                    returnDRMLicense.run(x,v)
```

The above contract has an associated contract identifier "C2" which corresponds to the contract identifier 230 in FIG. 2C. In the above "x" denotes a user (here, a viewer) identifier and "v" denotes an asset identifier of a media asset (here, a video).

An instance 114.a is shown running in the execution environment 208.a of the content providing system 108a in FIG. 5.

It should again be noted that the necessary operations defined in the second contract element are automatic operations effected by instantiating the second contract element in the contract execution environments of the content provider and content aggregator computer systems 108a, 108c. The automatic operations performed by the instance executed at any one of those computer systems are triggered automatically either in response to temporal triggers or in response to requests that have been instigated automatically by the instance executed at the other of those other computer system.

Figure 9:
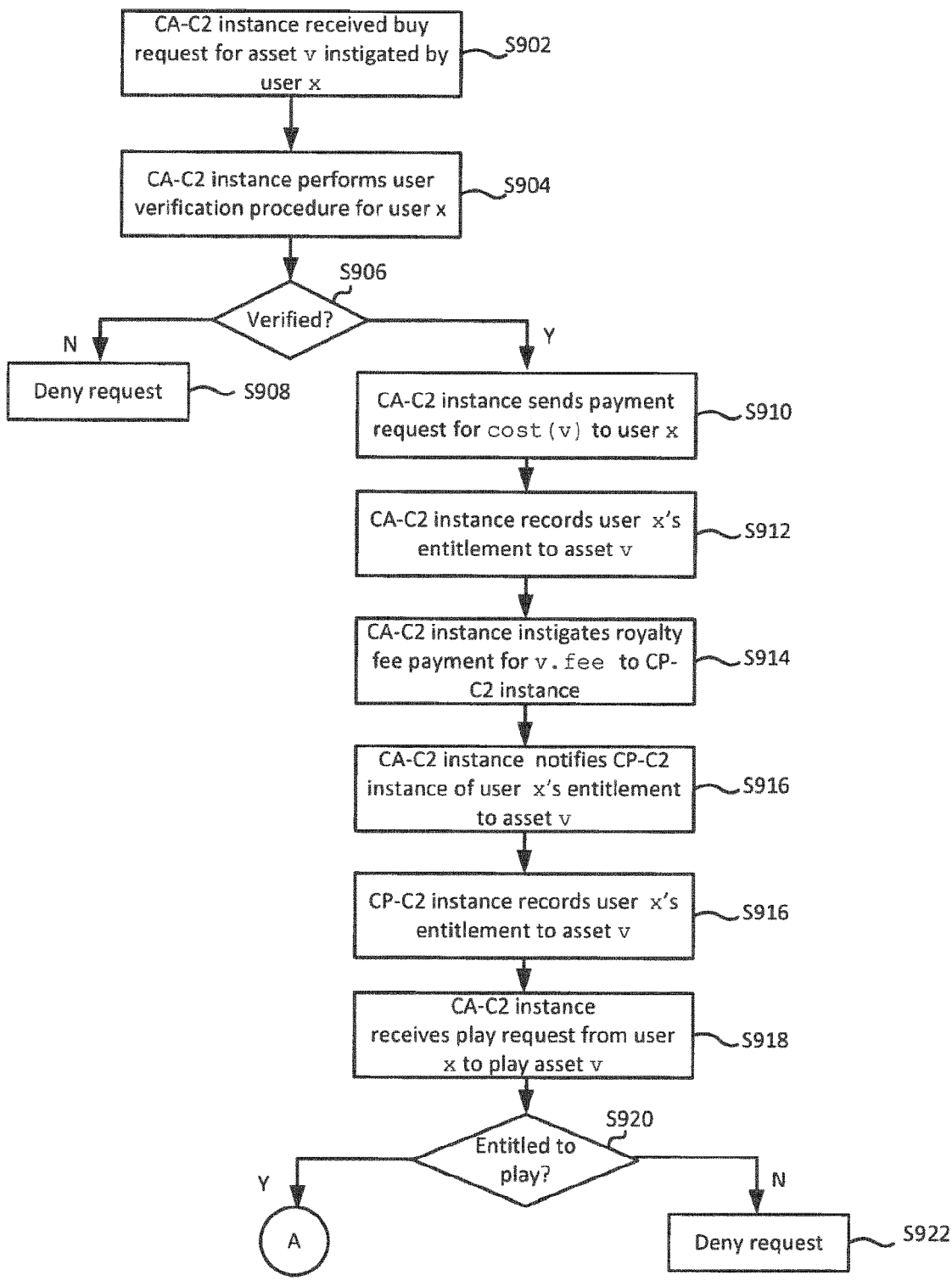
FIG. 9 is a flowchart for another method of regulating interactions between entities of a content delivery system.
Figure 9:
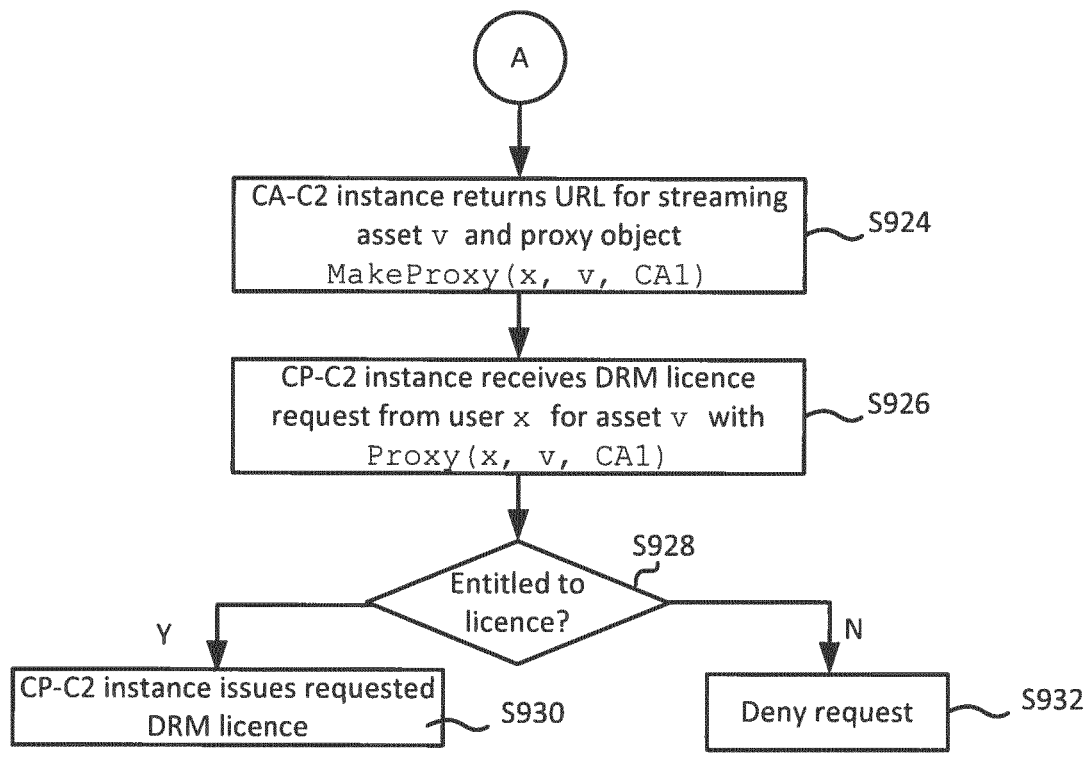

A method of regulating interactions between a content provider computer system 108a and a content aggregator computer system 108c will now be described with reference to FIG. 9, which is a flowchart for the method. The method of FIG. 9 represents functions that are collectively performed by the instance of the contract C2 running in the contract execution environment of the content provider's system 108a (CP-C2 instance) and the instance of the contract C1 running in the contract execution environment of the content aggregator computer system 108c (CA-C2 instance).

The contract C2 states that the content provider CP1 (108*a*) should make available a number of media videos (DearAnny.mdp, vanity.mdp) to the content aggregator CA1 (108*c*): the contract actually lists the videos regulated by the contract, reporting among others a fee that the content aggregator has to return to the content provider when the video is played. That is, each the contract comprises associations associating each video with an associated royalty fee ("Fee") payable to the content provider by the content aggregator when a viewer buys that video from the content aggregator, and a suggested price for the content aggregator to charge that viewer.

Furthermore, the contract C2 states what has to happen when the content aggregator receive a request buy from a viewer x (102) for buying a selected video v that have been licensed from content provider CP1. Specifically, this requires that CA1 has to perform a user verification procedure verify the buy request coming from the viewer in response (this involves, for instance, verifying if the user is already registered with the content provider and that they have not been placed on any black list).

At step S902 a buy request instigated by the viewer 102 is received by the CA-C2 instance. The buy request identified one or more videos that the viewer wishes to purchase, and also comprises a user identifier (e.g. username, email address etc.) of the user 102. At S904 the CA-C2 instance performs the user verification request to verify the identified user 102. This may involve, for instance, accessing registration data and/or black list data held in the content aggregation system 108*c*. The registration data comprises user identifiers of registered users who are registered within the content aggregation system 108*c*, and the blacklist data comprises user identifiers of blacklisted users who are not permitted to use the content aggregation system 108*c*.

At step S906, if the user verification is unsuccessful (e.g. because the received user identifier does not match any of the registered user identifiers and/or because it does match a blacklisted user identifier) then the method proceeds to step S908, at which the buy request is denied and the viewer 102 suitably informed. If, however, the user verification request is successful (e.g. because the received user identifier does match a registered user identifier and/or because it does not match any blacklisted user identifier), the method proceeds to step S910.

The contract C2 specifies performance of the following operations by CA-C2 instance if the verification is successful:

charge the cost of a selected video v to the viewer x by instigating a user payment request to the viewer (S910)

record that viewer x is entitled to watch that video v in the third computer storage 110*c* of the content aggregation system 108*c* (S912)

pay the content provider a royalty fee associated with the asset v by instigating a royalty payment request to the CP-C2 instance (S914)

transmit a notification to the content providing system 108*a* inform the content provider computer system 108*a* that the viewer x is entitled to watch that video v (S916)—recall that the content provider is in charge to release DRM licenses for each media asset.

The same contract C2 also states what the content provider has to do when it receives requests from the content aggregation system 108*c* for updating an entitlement of a user, namely that the content provider should also update the user entitlement.

At step S918, responsive to the notification received from the CA-C2 instance, the CP-C2 instance records that viewer x is entitled to watch video v in the first computer storage 110*a* of the content providing system 108*a*.

The same contract C2 states what the content aggregation system 108*c* has to do when it receives (S918) a play command from a viewer x identifying a video v to be streamed to that viewer x, namely, it has to verify the entitlement of that viewer x for consuming that video v (S920) and if that viewer is recorded as being so entitled in the content aggregation system computer storage 110*c*, return a URL ("Uniform Resource Locator") of that media asset that will be used for streaming (S924). The URL will be a URL of the Content Delivery Network 108*b* which can be used to stream the video v from the Content Delivery Network. If the user is not entitled, the request is refused (S922).

Notably, when CA1's system 108*c* returns the streaming URL to the viewer x for streaming the video v, it also returns (also S924) an object of type "Proxy" (MakeProxy (x, v, CA1)). The proxy object (proxy) comprises authorization data associating a user identifier of the viewer x with an asset identifier of the video v. The authorization data is digitally signed by the content aggregator system to demonstrate the authenticity of the authentication data to e.g. the content provider system and/or the CDN. Techniques for effecting authenticable digital signatures are well known in the art. This is because, for the viewer x, playing the video v involves a call to the CDN 108*b* requesting the corresponding streaming and, in this specific example, to CP1's system 108*a* requesting the DRM license for video v. However, viewer x has not signed any contract with the CDN provider CDNP1 (122*b*), nor with the content provider CP1 (122*a*), and therefore the viewer's requests will be only taken into account if it is acting on behalf of CA1 that, vice versa, has signed contracts with both the CDN provider CDN1 (122*b*) and the content provider CP1 (122*a*). Contract C2 also specifies what the content provider CP1's system 108*a* has to do when it receives a DRM license request from a user acting on behalf of CA1, namely operate to verify the viewer x's entitlement and, if verified, return the requested DRM license to the viewer x.

The same contract C2 also states what the content providing system 108*a* has to do when it receives requests from the content aggregation system 108*c* for payment of a royalty, namely verify the request and issue a DRM license if the verification is successful.

At step S926, the CP-C2 instance receives a license request instigated by the viewer to the CP-C2 instance, that request instigated using the proxy object returned by the CA-C2 instance. If the viewer is recorded as being entitled to watch the requested video in the content providing system computer storage 110*a* (S928), the CP-C2 instance issues (S930) the requested DRM license which the viewer can then use to instigate streaming of the desired video from the CDN 108*b*. If not, the request is refused (S932).

An entity A should only accept requests either coming from an entity B that have directly signed a contract with A or from an entity C that has signed a contract with B but not directly with A, provided that C owns a proxy from B. The proxy must be included in any request from C to A; the execution environment of A, before taking the request from C into account, has to verify if the proxy is valid (namely, it has been issued by an entity that owns a valid contract with A; in addition, proxies also have a time validity and therefore it is valid if it is not yet expired). If C verifies that the proxy is valid, the request is taken into account and can becomes a stimulus for one or more actions.

In general, an entity Z may have received more than one proxy from other entities in the network; the execution environment of Z is in charge to maintain a list of the received valid proxies, by removing the ones that have expired so far. Each message generated by Z toward another entity should also include the complete list of valid proxies owned by Z.

The contract C2 may also contain metadata such as keywords ("Keywords", above) describing the asset, that can be used by CA1, if needed. It should be noted that the contract labelled C2' shown running at the CDN in FIG. 5 isn't the contract C2 between CP1 and CA1 CDN1 is not involved in the contract C2 between CP1 and CA1.

Similarly, a CDN-CA contract between CDN1 and CA1 will define which assets the CDN1 can stream on behalf of CA1 and the fee that the CA1 has to pay to the CDN1 for this service. Furthermore, this contract will also specify that if CDN1 receives a streaming request from a viewer x for video v and viewer x owns a valid proxy issued by CA1, CDN1 can actually start streaming video v to viewer x.

For content aggregators offering their services to viewers, the contract is implicitly embedded in a video portal; specifically, when the viewer will register to the service it will implicitly accept the contract provided by the content aggregator. The meta-language describing the contracts is the same for contracts involving viewers, and the user device and content aggregator each holds and executes instances of further contract software embodying a contract between the user and the content aggregator; such contracts are 'implicit' in the sense that the viewer need not be concerned by the technical details of the contract definition language: when he/she registers to the service, the corresponding software contracts are automatically enforced. He/she may be presented with a verbal description of the conditions, similar to 'Terms&Conditions' normally accepted when using a service in the cloud, and the software contract is automatically run in a Contract Execution Environment of the viewer provided by a processor (e.g. 304) of their user device.

The overall video streaming system 100 acts as an open network of business entities willing to play a role in the system. It is open in the sense that entities can freely enter or exit the network: the only condition for being part of the network is the acceptance of contracts. Interested entities install software implementing the video streaming system in their infrastructure. This software will permit them to define the role they want to play and to fill the corresponding information (e.g., content providers will have to fill the catalogue of available titles). The software includes predefined contract templates that the entities will have to complete by providing the missing information (e.g., the sell price for each asset); new contracts can be created from scratch by combining basic (atomic) operations provided by the system.

When a contract template is complete, it is published; this will entail that all the other entities participating in the network will be informed of the possibilities offered by the new contracts. A peer-to-peer broadcast-like protocol can be used to distribute to every member of the network the information about new entities and contracts available in network. Each entity in the network can therefore have a local directory from which to see the entities, the roles and contracts available in the network. The software system will also provide the tools that an entity can use to enter into an agreement with the parties it is interest in. Therefore, a CDN provider can enter into an agreement with a number of content providers; a content aggregator can select the videos it wants to include in its video portal by accepting the contracts with the relevant content providers and at the same time, it can select the CDN provider enabled to stream the same videos.

Each entity in the system is identified by a public-private key pair and all interactions between the parties involved in a negotiation is cryptographically signed in order to guarantee authenticity.

When a content aggregator has defined all the agreements with content and CDN providers he can build a video portal for viewers. How the portal or device application is developed, which functions it provides to viewers and which technology it is based upon, is left to content aggregators that can therefore compete each other based on the appeal of the service they provide to viewers.

When the portal/application is developed, viewers can register to the service (and hence accepting a contract with the content provider), browse the catalogue, select a video of interest, buy a license to view the video and then play the video, meaning to send a request to the content aggregator which in turns will return the reference of the CDN provider that will start streaming video.

All these actions are automatically executed as actions coded in a number of contracts agreed among the parties. Therefore, once a contract has been accepted by the parties, the software system itself will act as the authority in charge to guarantee that the obligations stated in that contract are enforced.

Figure 6:
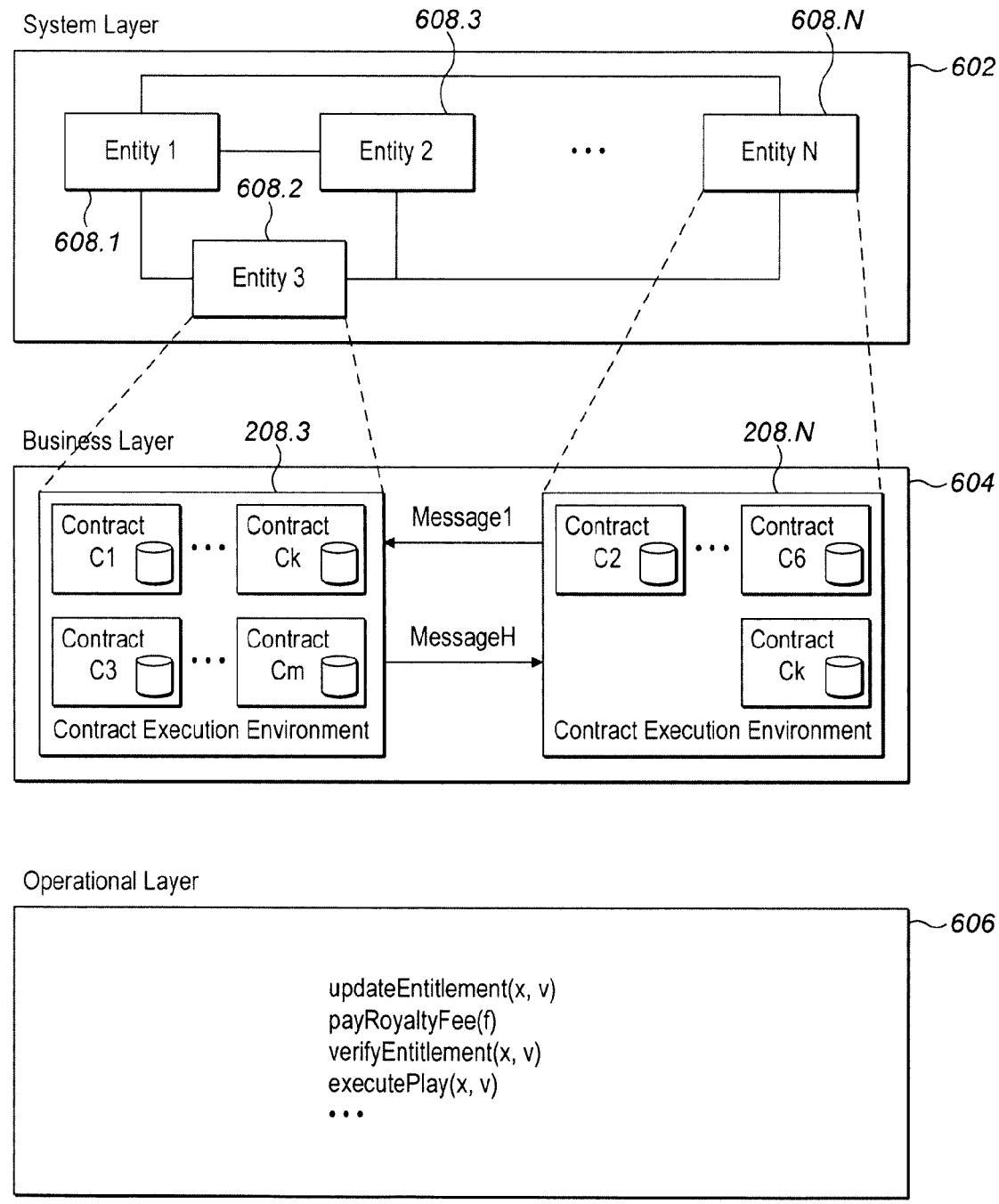
FIG. 6 is a schematic illustration of logical layers of a content delivery system.

The overall system 100 can be considered as comprising three separate logical layers as shown in FIG. 6. FIG. 6 is a schematic illustration of the underlying architecture of the system 100. The system comprises a higher-level system logic layer 602, a lower-level operational logic layer 606, and an intermediate business logic layer 604.

The system layer 602 contains entities 608.1, . . . , 608.N of the content delivery system 100 (content providers, content aggregators, CDN providers, users etc.) and their business relationships in the form of contracts. At this level, the content delivery system 100 is a peer-to-peer system such that when a new entity enters the content delivery system 100, all other participants are informed of the new entrant and each entity has a complete view of the system 100. Furthermore, it is at this level that negotiations of contracts between the parties take place. As the system 100 is a fully in decentralized organization, at this level is possible to also introduce some form of mutual judgment between the parties involved in a business relation that could be the basis for the creation of a reputation system used by the new entrants for selecting partners.

The business layer 604 comprises contract execution environments 502.1, . . . , 502.N of each entity 608.1, . . . , 608.N, each one of those execution environments containing the currently active contract instances: exchange of messages between the active contract instances defines the business processes and hence the behaviour of the system, as discussed above.

The operational layer 606 is constituted by a set of primitive (atomic) operations provided by the software system and that can be used for the creation of processes specified by contracts.

Cryptographic secure protocols may be adopted within the system 100, such as the ones adopted in the field of crypto-currencies for the implementation of the system described in this paper.

As discussed, the disclosure provides a distributed autonomous organization whose overall objective is to create a video streaming service for end-users. The system consists of a number of specialized entities such as content providers or CDN providers that have entered in business relations with each other. Business relations are formalized in the system by means of contracts. Each entity that intends to play a role in the system will publish the type of contracts that it intends to fulfil and any other entity can enter into a business relation with it if it subscribes the conditions stated in those contracts. Operationally, contracts define a number of procedures that are automatically executed by the system when activated by appropriate stimuli. The overall system behaviour is determined by the execution of the procedures contained in those contracts.

The system is designed by clearly separating the roles of the entities of the network, such that each of them can focus on its specialty; nevertheless, the design has covered all the aspects necessary to guarantee that each entity is properly rewarded and that videos are watched in full compliance with the rights of each stakeholder in the system.

The enforcement of the mutual obligations among the parties defined by the contracts is an intrinsic feature of the distributed system that we have presented and this is a mandatory condition for a distributed system without a centralized ruling authority as this one.

This disclosure has provided a number of contributions, namely:
- has defined a video streaming system as an open network of entities each one playing one of the roles defined in the system;
- has defined the concept of a executable "contracts" between the parties of the network that have entered into a business relation;
- has introduced a domain-specific (that is media-streaming specific) meta-language for expressing contracts;
- has presented how the proposed system could be used to create a video streaming service also suitable for small/micro enterprises such as niche video producers and small video portals with limited computer and network resources at their disposal.

Whilst in the above, a video streaming system is described by way of example, the invention can be equally applied to the streaming of any digital assets. That is, the invention also applies to the streaming of media assets other than video assets, e.g. audio assets in a distributed media (e.g. audio) streaming system.

It will be appreciated that the above embodiments have been described only by way of example, and other variants or applications may be apparent to a person skilled in the art given the disclosure herein. The scope is not limited by the described examples but only by the following claims.

The invention claimed is:

1. A distributed content delivery system of networked computer systems, the content delivery system comprising:
    at least one user device having an output interface available to an associated user;
    at least one first computer system entity, each configured to execute a respective first instance of contract software defining permissions and obligations;
    at least one second computer system entity, each configured to execute a respective second instance of contract software defining permissions and obligations; and
    at least one third computer system entity, each configured to execute a respective third instance of contract software defining permissions and obligations;
    wherein each entity is configured to publish by a peer-to-peer broadcast-like protocol to all other entities in the network its identity and its associated permissions and obligations, under which all functions of a streaming service provided by the entity are mediated and controlled,
    wherein an interface to facilitate a streaming service is established autonomously to run continuously over a period of time between at least one first entity and at least one second entity in dependence on the permissions and obligations of each entity being accepted by the other entity,
    wherein whilst the interface is established any incoming request at either entity is intercepted to verify if the request is an activation condition for an action defined in the contract, and if so the action is executed, such that contract software instances mediate all interactions between the entities themselves, wherein exchanging of requests between the entities and the execution of atomic operations defines a behaviour of the system to facilitate the streaming surface,
    wherein a further interface to facilitate a streaming service is established autonomously to run continuously over a period of time between at least one third entity and at least one first or second entity in dependence on the permissions and obligations of each entity being accepted by the other entity, wherein whilst the further interface is established any incoming request at either entity is intercepted to verify if the request is an activation condition for a further action defined in the contract, and if so the further action is executed, such that contract software instances mediate all interactions between the entities such that those instances enforce any obligations agreed by the entities themselves, wherein exchanging of requests between the entities and the execution of atomic operations defines a further behaviour of the system to facilitate the streaming service.

2. A distributed content delivery system according to claim 1 in which the first or second computer system entity is an entity of one of: a content provider computer system; a content delivery computer system; and a content aggregation computer system.

3. A distributed content delivery system according to claim 1 in which the first or second computer system entity is an entity of a content provider computer system from which one or more media assets are provided for streaming.

4. A distributed content delivery system according to claim 1 in which the first or second computer system entity is an entity of a content delivery computer system for streaming a media asset to the user device.

5. A distributed content delivery system according to claim 1 in which one of the first or second computer system entities is an entity of a content providing computer system and the other is an entity of a content delivery computer system, in which the content delivery computer system is for streaming media assets, provided from the content providing computer system, to a user device.

6. A distributed content delivery system according to claim 1 in which one of the first or second computer system entity is an entity of a content aggregation computer system providing the identity of content for streaming.

7. A distributed content delivery system according to claim 1 in which one of the first or second computer system entities is an entity of a content aggregation computer system and the other is a content provider computer system in which an asset identified in the content aggregation computer system is provided.

8. The distributed content delivery system of claim 1 in which each of the at least one first computer system entity, the at least one second computer system entity, and the at least one third computer system entity comprises an entity of one of: a content provider computer system; a content delivery computer system; and a content aggregation computer system.

9. The distributed content delivery system of claim 1 in which the at least one first computer system entity is at least one content aggregation computer system entity, each operated by a content aggregator, each holding a catalogue of media assets in computer storage, the catalogue of each accessible from at least one user device, and each configured to execute a content aggregation instance of contract software defining permissions and obligations, the at least one second computer system entity is at least one content delivery computer system entity, each operated by a content supplier, each for effecting streaming of media assets to at least one user device in the distributed content delivery system, and each configured to execute a content supply instance of contract software defining permissions and obligations, and the at least one third computer system entity is at least one content provider computer system, each operated by a content provider, each configured to execute a content provider instance of contract software defining permissions and obligations, wherein in order to provide an asset streaming service an interface is established between the content provider computer system entity and the content delivery computer system entity, an interface is established between the content provider computer system entity and the content aggregation computer system entity, and an interface is established between the content delivery computer system entity and the content aggregation computer system entity.

10. The distributed content delivery system of claim 9 wherein there is further established an interface between the user device and the content aggregation computer system entity.

11. The distributed content delivery system of claim 1 in which the at least one first and second computer system entities are independent but interrelated entities such that a distributed content delivery system is established without a centralised controlling party, in which the interrelationship between the independent entities is provided by formalised contracts established between the respective contract entities.

12. The distributed content delivery system of claim 1 in which at least one of the first and second entities is a specialised entity for providing specialised functionality within the distributed content delivery system.

13. The distributed content delivery system of claim 1 in which the first computer system entity is at least one content aggregation computer system entity, each operated by a content aggregator, each holding a catalogue of media assets in computer storage, the catalogue of each accessible from at least one user device, and each configured to execute a content aggregation instance of contract software defining permissions and obligations, and the second computer system entity is at least one content supply computer system entity, each operated by a content supplier, each for effecting streaming of media assets to at least one user device in the distributed content delivery system, and each configured to execute a content supply instance of contract software defining permissions and obligations, wherein responsive to a content access request identifying the user and a requested media asset, the content aggregation instance is configured to detect whether the contract permits the identified user to access the identified asset and if so to grant the user device access to the content supply instance, thereby enabling the identified asset to be transmitted to the user device as a media stream for outputting to the user while the media stream is still being received at the user device.

14. A method of delivering content in a network of distributed computer systems comprising at least one user device having an output interface available to an associated user, at least one first computer system entity, each first computer system entity configured to execute a respective first instance of contract software defining permissions and obligations and at least one second computer system entity, each second computer system entity configured to execute a respective second instance of contract software defining permissions and obligations, at least one third computer system entity, each third computer system entity configured to execute a respective third instance of contract software defining permissions and obligations, the method comprising:

publishing by a peer-to-peer broadcast-like protocol from each computer system entity to all other computer system entities in the network an identity and associated permissions and obligations of each entity, under which all functions of a streaming service provided by the entity are mediated and controlled;

establishing an interface to facilitate a streaming service autonomously to run continuously over a period of time between at least one first entity and at least one second entity in dependence on the permissions and obligations of each entity being accepted by the other entity;

intercepting, whilst the interface is established, any incoming request at either entity to verify if the request is an activation conditions for an action defined in the contract, and if so executing the action, such that contract software instances mediate all interactions between the entities such that those instances enforce any obligations agreed by the entities themselves, wherein exchanging of requests between the entities and the execution of atomic operations defines a behavior of the system to facilitate the streaming service;

establishing a further interface to facilitate a streaming service autonomously to run continuously over a period of time between at least one third entity and at least one first or second entity in dependence on the permissions and obligations of each entity being accepted by the other entity; and intercepting whilst the further interface is established, any incoming request at either entity is intercepted to verify if the request is an activation condition for a further action defined in the contract, and if so the further action is executed, such that contract software instances mediate all interactions between the entities such that those instances enforce any obligations agreed by the entities themselves, wherein exchanging of requests between the entities and the execution of atomic operations defines a further behaviour of the system to facilitate the streaming service.

15. The method according to claim 14 in which the first or second computer system entity is one of: an entity of a content provider computer system; an entity of a content delivery computer system; and an entity of a content aggregation computer system.

16. The method of claim 14 in which the at least one first and second computer system entities are independent but interrelated entities, the method comprising:

establishing a distributed content delivery system without a centralised controlling party; and providing the interrelationship between the independent entities by formalised contracts established between the respective contract entities.

17. The method of claim 14 in which at least one of the first and second entities is a specialised entity, the method further comprising providing specialised functionality within the distributed content delivery system utilising the specialised entity.

18. A non-transitory computer-readable medium comprising computer readable code which, when executed on a computer performs the method of delivering content in a network of distributed computer systems comprising at least one user device having an output interface available to an associated user, at least one first computer system entity, each configured to execute a respective first instance of contract software defining permissions and obligations, at least one second computer system entity, each configured to execute a respective second instance of contract software defining permissions and obligations, and at least one third computer system entity, each configured to execute a respective third instance of contract software defining permissions and obligations, the method comprising:

- each entity publishing by a peer-to-peer broadcast-like protocol to all other entities in the network its identity and its associated permissions and obligations, under which all functions of a streaming service provided by the entity are mediated and controlled;
- establishing an interface to facilitate a streaming service autonomously to run continuously over a period of time between at least one first and at least one second entity in dependence on the permissions and obligations of each entity being accepted by the other entity;
- intercepting, whilst the interface is established, any incoming request at either entity to verify if the request is an activation condition for an action defined in the contract, and if so executing the action, such that contract software instances mediate all interactions between the entities such that those instances enforce any obligations agreed by the entities themselves, wherein exchanging of requests between the entities and the execution of atomic operations defines a behaviour of the system to facilitate the streaming service;
- establishing a further interface to facilitate a streaming service autonomously to run continuously over a period of time between at least one third entity and at least one first or second entity in dependence on the permissions and obligations of each entity being accepted by the other entity; and
- intercepting whilst the further interface is established, any incoming request at either entity is intercepted to verify if the request is an activation condition for a further action defined in the contract, and if so the further action is executed, such that contract software instances mediate all interactions between the entities such that those instances enforce any obligations agreed by the entities themselves, wherein exchanging of requests between the entities and the execution of atomic operations defines a further behaviour of the system to facilitate the streaming service.

* * * * *